United States Patent
Perkins et al.

(10) Patent No.: US 10,108,946 B2
(45) Date of Patent: Oct. 23, 2018

(54) PAYMENT PROCESSING WITH DYNAMIC BARCODES

(71) Applicant: Handle Financial, Inc., Sunnyvale, CA (US)

(72) Inventors: Richard Scott Perkins, Eagle, ID (US); Kurt Torben Thams, Santa Cruz, CA (US); Daniel J. Shader, Palo Alto, CA (US)

(73) Assignee: HANDLE FINANCIAL, INC., Sunnyvale, CA (US)

( * ) Notice: Subject to any disclaimer, the term of this patent is extended or adjusted under 35 U.S.C. 154(b) by 0 days.

(21) Appl. No.: 14/189,007

(22) Filed: Feb. 25, 2014

(65) Prior Publication Data

US 2014/0358707 A1    Dec. 4, 2014
US 2016/0162866 A9    Jun. 9, 2016

Related U.S. Application Data

(63) Continuation-in-part of application No. 13/087,271, filed on Apr. 14, 2011.
(Continued)

(51) Int. Cl.
*G06K 1/00* (2006.01)
*G06Q 20/32* (2012.01)
(Continued)

(52) U.S. Cl.
CPC ........... *G06Q 20/204* (2013.01); *G06Q 20/02* (2013.01); *G06Q 20/202* (2013.01); *G07G 1/0045* (2013.01)

(58) Field of Classification Search
None
See application file for complete search history.

(56) References Cited

U.S. PATENT DOCUMENTS 6,381,582 B1 *  4/2002  Walker .............. G06Q 20/02
                                          705/26.41
7,783,541 B1 *  8/2010  Rolf ................. G06Q 20/04
                                          455/406
(Continued)

OTHER PUBLICATIONS

Dealer Incentives, by Tim Gutowski, http://www.cars.com/go/advice/Story.jsp?section=inc&story=incDealer&subject=incent, verified by Internet Archive WayBack Machine Apr. 27, 2005.*
(Continued)

*Primary Examiner* — Ig T An
(74) *Attorney, Agent, or Firm* — Hall Estill Attorneys at Law

(57) ABSTRACT

A system, method and apparatus for payment processing using dynamic barcodes is provided. In an embodiment, a method is provided. The method includes receiving a request to stage an order, including information identifying a merchant. The method further includes determining current order information for the merchant. The method also includes producing a token identifier for the order. The token identifier includes an item code and a ticket identifier. The item code identifies or references an economic understanding for the order. Additionally, the method includes staging the order within a system to allow for completion of the order later in time. The order completes through notification of payment to a POS terminal by a consumer and fulfillment of the order by the merchant. The method further includes sending the token identifier to the merchant. The token identifier is to be provided to the consumer for use by the consumer in paying for the order at the POS terminal. The POS terminal is remote from the merchant.

19 Claims, 19 Drawing Sheets

Related U.S. Application Data

(60) Provisional application No. 61/830,644, filed on Jun. 4, 2013.

(51) Int. Cl.
*G07G 1/00* (2006.01)
*G06Q 20/20* (2012.01)
*G06Q 20/02* (2012.01)

(56) References Cited

U.S. PATENT DOCUMENTS

| | | | | |
|---|---|---|---|---|
| 2001/0051915 A1* | 12/2001 | Ueno | G06Q 20/04 | 705/39 |
| 2004/0024701 A1* | 2/2004 | Hansen | G06Q 20/00 | 705/39 |
| 2006/0080240 A1* | 4/2006 | Mersky | G06Q 20/02 | 705/40 |
| 2006/0167791 A1* | 7/2006 | Hahn-Carlson | G06Q 20/04 | 705/39 |
| 2007/0051794 A1* | 3/2007 | Glanz | G06Q 20/04 | 235/379 |
| 2007/0132589 A1* | 6/2007 | Kim | G07B 17/00024 | 340/572.1 |
| 2007/0233510 A1* | 10/2007 | Howes | G06Q 30/0601 | 705/26.1 |
| 2007/0299779 A1* | 12/2007 | Sung | G06F 21/121 | 705/51 |
| 2008/0158588 A1* | 7/2008 | Haas | G07B 17/00508 | 358/1.15 |
| 2008/0222048 A1* | 9/2008 | Higgins | G06Q 20/12 | 705/67 |
| 2009/0228336 A1* | 9/2009 | Giordano | G06Q 20/04 | 705/75 |
| 2010/0125509 A1* | 5/2010 | Kranzley | G06Q 20/20 | 705/17 |
| 2011/0101085 A1* | 5/2011 | Nakagawa | G06F 17/30716 | 235/375 |
| 2011/0231285 A1* | 9/2011 | Englund | G06O 30/0603 | 705/26.41 |
| 2011/0258122 A1* | 10/2011 | Shader | G06Q 20/14 | 705/67 |
| 2011/0320293 A1* | 12/2011 | Khan | G06Q 20/0457 | 705/16 |
| 2012/0006891 A1* | 1/2012 | Zhou | G06Q 20/3274 | 235/380 |
| 2012/0185317 A1* | 7/2012 | Wong | G06Q 30/0222 | 705/14.23 |
| 2012/0284130 A1* | 11/2012 | Lewis | G06Q 20/00 | 705/16 |
| 2013/0013499 A1* | 1/2013 | Kalgi | G06Q 20/12 | 705/41 |
| 2013/0018758 A1* | 1/2013 | Balasubramanian | G06Q 30/06 | 705/26.41 |

OTHER PUBLICATIONS

Channel Loyalty Program, http://www.awards.co.za/what-we-do/sales-channel-incentive-programs/channel-loyalty-program/, Achievement Awards Group, verified by Internet Archive WayBack Machine May 12, 2013.*

* cited by examiner

| Lower bound | Upper bound | Fee |
|---|---|---|
| 0 | 10 | 0.50 |
| 11 | 100 | 0.60 |
| 101 | 999 | 0.70 |
| 1000 | 9999 | 0.80 |
| 10000 |  | 0.90 |

FIG. 10

| UPC Code | Payment Economics |
|---|---|
| Xxx00001 | Econ1 |
| Xxx00002 | Econ2 |
| Xxx00003 | Econ3 |
| ... | ... |
| Xxx01003 | Econ1003 |
| ... | ... |
| Xxx03133 | Econ3133 |
| ... | ... |

FIG. 12

PAYMENT PROCESSING WITH DYNAMIC BARCODES

The present application claims the benefit of priority from U.S. patent application Ser. No. 61/830,644 and is a Continuation in Part of U.S. patent application Ser. No. 13/087,271 filed Apr. 14, 2011 and is currently pending.

BACKGROUND

When one attempts to handle a complicated transaction where a merchant is asking a payment processor to process a payment at a POS terminal or retail location physically remote from a merchant, some things can be predicted and other things cannot. It may be useful to attempt to encode as much predictable data as possible at the time of initiation or staging of an order or a transaction. This may allow faster and more predictable execution of the process of accepting a payment at the time of payment for the order. This may also allow for encoding of incentives or promotions, for example. However, there may also be some aspects of the order determined by where a payment is made, which may not be amenable to encoding.

SUMMARY

A system, method and apparatus for payment processing using dynamic barcodes is provided. In an embodiment, a method is provided. The method includes receiving a request to stage an order, including information identifying a merchant. The method further includes determining current order information for the merchant. The method also includes producing a token identifier for the order. The token identifier includes an item code and a reference to an order. The item code references an economic understanding for the order. Additionally, the method includes staging the order within a system to allow for completion of the order later in time. The order completes through notification of payment to a POS terminal by a consumer and fulfillment of the order by the merchant. The method further includes sending the token identifier to the merchant. The token identifier is to be provided to the consumer for use by the consumer in paying for the order at the POS terminal. The POS terminal is remote from the merchant.

In some embodiments, producing a token identifier for the order includes producing multiple different token identifiers for the order. Each token identifier includes the reference to an order and an item code. A first token identifier of the multiple token identifiers includes a first item code and a second token identifier of the multiple token identifiers includes a second item code. The first item code identifies a first economic understanding for the order. The second item code identifies a second economic understanding for the order. Additionally, sending the token identifier to the merchant includes sending each of the multiple token identifiers to the merchant. The merchant may choose which token identifier or which token identifiers of the multiple token identifiers to provide to the consumer.

In another embodiment, producing a token identifier for the order includes producing multiple different token identifiers for the order. Each token identifier includes the ticket identifier and an item code. A first token identifier of the multiple token identifiers includes a first item code and a second token identifier of the multiple token identifiers includes a second item code. The first item code is associated with a first type of POS terminal for the order. The second item code is associated with a second type of POS terminal for the order. Sending the token identifier to the merchant includes sending each of the multiple token identifiers to the merchant. The merchant provides all of the multiple token identifiers to the consumer.

In another embodiment, a method is provided. The method includes receiving a request to stage a first order, including information identifying a merchant. The method includes determining current order information for the merchant. Additionally, the method includes producing a first token identifier for the first order. The first token identifier includes an item code and a first ticket identifier. The item code of the first order identifies an economic understanding for the first order. Also, the method includes staging the first order within a system to allow for completion of the first order later in time through notification of payment to a POS terminal by a consumer and fulfillment of the first order by the merchant. Moreover, the method includes sending the first token identifier to the merchant. The first token identifier is to be provided to the consumer for use by the consumer in paying for the first order at the POS terminal. The POS terminal is remote from the merchant.

The method further includes receiving a request to stage a second order, including information identifying the merchant. The method also includes determining current order information for the merchant. Furthermore, the method includes producing a second token identifier for the second order. The second token identifier includes an item code and a second ticket identifier. The item code of the second order identifies an economic understanding for the second order. Also, the method includes staging the second order within a system to allow for completion of the second order later in time through notification of payment to a POS terminal by a consumer and fulfillment of the second order by the merchant. Additionally, the method includes sending the second token identifier to the merchant. The second token identifier is to be provided to the consumer for use by the consumer in paying for the second order at the POS terminal. The POS terminal is remote from the merchant.

In yet another embodiment, a method is provided. The method includes receiving a request to stage a plurality of orders, including information identifying a merchant. The method further includes determining current order information for the merchant. The method also includes producing a token identifier for each order of the plurality of orders and associating the token identifier with an order of the plurality of orders. The token identifier for each order includes an item code and a ticket identifier. The item code identifies an economic understanding for the order associated with the token identifier. The ticket identifier of the token identifier is specific to the order associated with the token identifier. The method also includes staging each order of the plurality of orders within a system to allow for completion of each order later in time through notification of payment to a POS terminal by a consumer and fulfillment of the order by the merchant. The method further includes sending each token identifier to the merchant. Each token identifier is to be provided to a consumer for use by the consumer in paying for the order at the POS terminal. The POS terminal is remote from the merchant.

BRIEF DESCRIPTION OF THE DRAWINGS

The present invention is illustrated by way of example in the accompanying drawings. The drawings should be understood as illustrative rather than limiting.

FIG. 10 illustrates an embodiment of a schedule of fees which may be associated with the economic understanding of an order.

FIG. 12 illustrates an embodiment of a set of entries of an economic understanding corresponding to item codes in an embodiment.

DETAILED DESCRIPTION

Figure 1:
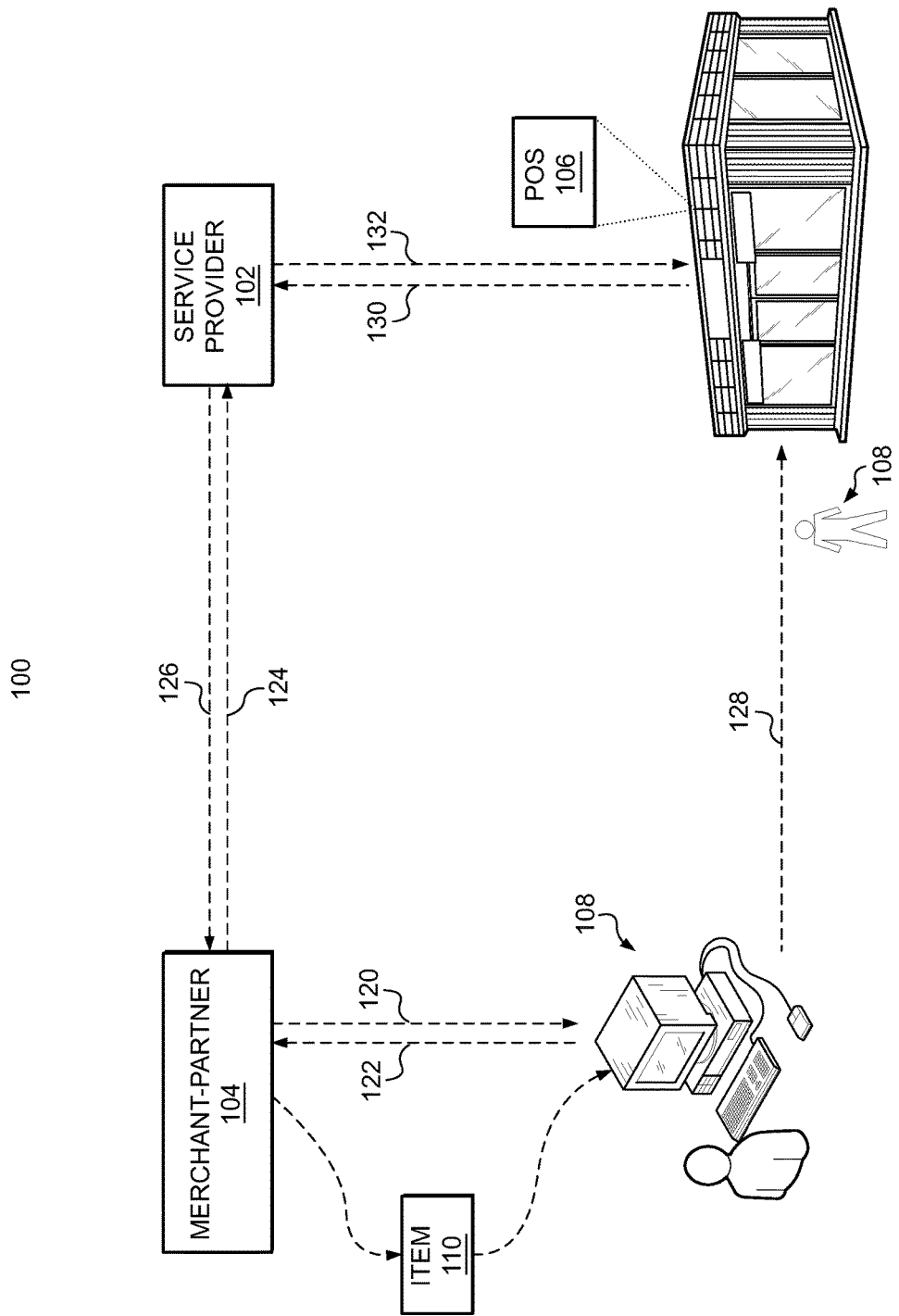
FIG. 1 is a high-level flow process chart illustrating the relationships between the parties that partake in the presented systems and methods.

A system, method and apparatus is provided for payment processing with dynamic barcodes. The specific embodiments described in this document represent example instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

The present application is related to co-pending and co-owned U.S. application Ser. Nos. 13/123,067 and 13/087,271, filed Apr. 7, 2011, and Apr. 14, 2011, respectively; the disclosures of which are herein incorporated by reference in their entirety. For example, U.S. application Ser. No. 13/087,271 discloses systems and methods that generally include: (a) staging an order between a merchant and a customer; (b) tokenizing the order by linking one or more order instructions to a token ID; (c) providing the customer with the token ID, wherein the customer can then present the token ID and a payment to a point-of-sale (POS) terminal; (d) receiving confirmation that the customer has presented, to the POS terminal, the token ID and a payment in accordance with the one or more order instructions; (e) notifying the merchant that the customer provided the payment to the POS terminal; and (f) settling the order between the POS terminal and the merchant. The systems and methods presented herein expand on and further develop the settlement process presented in U.S. application Ser. Nos. 13/123,067 and 13/087,271.

Before describing various embodiments in more detail, it is appropriate to define certain terms and phrases. The terms "merchant" and "merchant-partner" are used interchangeably herein. It is noted that the term "merchant" and/or "merchant-partner" is not limited to entities that directly sell goods/services. For example, a merchant may be a loan service, collections service, money transfer service, bill payment service, bank deposit service, credit union, etc. A payment processor may, in some embodiments, act on behalf of a merchant, for example. The terms "consumer," "customer," and "end user" are used interchangeably herein. However, it is noted that the use of the systems and methods presented is not limited to sale/purchase orders between a seller and a buyer. The systems and methods presented may be used to facilitate transactions or orders between: two individuals, an individual and a business, two businesses, etc. The systems and methods presented may also be used to facilitate transactions or orders between any two parties that have a pre-existing relationship or obligation(s). The terms "point-of-sale," "point of-sale terminal," "POS," "POS terminal," and "point-of-payment" are used interchangeably herein. It is also noted that terms such as "POS" or "POS terminal" may include the actual terminal where payment is presented and received (e.g., the cash register), or may include the POS back office or any entity controlling one or more of the actual terminals. The terms "service provider" and "payment processor" are used interchangeably herein. The term "token" or "payment token" refers to a piece of information which can be used to determine how to process a payment made by a customer at a retail location such as a POS terminal, for example. The term "token document" refers to a document that incorporates or bears or embodies a payment token, and may refer to an invoice, bill, Payslip™ or other type of document, whether in paper, electronic or other form. An "order" may be expected to refer to a representation in a payment processor system, created by responsive to a request by a merchant, of the merchant product or service that is to be paid for. This may be expected to include information such as for how long in time payments should be accepted, as well as a reference to any pricing plan or economic understanding associated with each payment that may be accepted against that order. A "ticket identifier" may refer to information which references an order in a payment processor system, for example.

The following is a description of one or more embodiments of the present invention, with reference to the figures. It is to be understood that the present invention is not limited to the particular embodiments described. It is also to be understood that the terminology used herein is for the purpose of describing particular embodiments only, and is not intended to be limiting, since the scope of the present invention will be limited only by the appended claims.

Various embodiments generally relate to systems and methods for facilitating transactions between a merchant-partner and a customer. For example, an embodiment provides a merchant-partner with a means for conducting a cash transaction via a remote POS terminal. Such an embodiment is particularly useful in facilitating transactions such as: sale/purchase agreements, loan repayments, collections, money transfers, bill payments, remote deposits, etc.

In one embodiment, a service provider and/or POS terminal serves as an intermediary between a merchant-partner and the customer. The system allows the customer to pay for the merchant-partner's goods/services in cash (or cash equivalents) at a POS terminal. Other forms of payment may also be received at the POS terminal. The POS terminal and/or service provider then notifies a payment processor and the payment processor notifies the merchant that the customer has made a payment. After the merchant-partner has received a notification, validation, or other confirmation of payment, the merchant-partner can securely complete the agreed upon order between the merchant-partner and the customer.

However, in order for such system to be commercially viable, the systems and methods presented generally include the process steps of: (a) staging an order between the merchant and the customer; (b) tokenizing the order by linking one or more order instructions to a token ID; (c) providing the customer with the token ID, wherein the customer can then present the token ID and a payment to a POS terminal; (d) receiving confirmation that the customer has presented, to a POS terminal, the token ID and a payment in accordance with the one or more order instructions; (e) notifying the merchant that the customer provided the payment to the POS terminal; and (f) settling the order between the POS terminal and the merchant.

FIG. 1 is a high-level flow process chart, illustrating the relationships between the parties that partake in the presented system 100. In general, system 100 includes four key parties: (1) service provider 102; (2) merchant-partner 104; (3) point-of-sale (POS) 106; and (4) end user 108. Other parties or entities may be involved, interposed between the illustrated entities or involved without being interposed between the entities illustrated. The dashed lines in FIG. 1 generally represent a flow of information, data, or process between respective parties. In practice, the dashed lines in FIG. 1 represent user interfaces and/or application program interfaces (APIs) for the transmission of information, data, instructions, funds, etc.

As will be described further below, service provider 102 and POS 106 play a central role in facilitating orders between merchant-partner 104 and end user 108. In one embodiment, each party serves a stand-alone function within system 100. However, in an alternative embodiment, service provider 102 may be incorporated into, or be a functional unit of, merchant-partner 104 and/or POS 106. Further, merchant-partner 104 may be any type of merchant, seller, or retailer; such as an online, web-based merchant, or catalog-based merchant. POS 106 may be a local retailer (e.g., relative to end user 108), ATM, kiosk, or other cash-exchange terminal, intermediary, or equivalent thereof.

In FIG. 1, process flow 120 and 122 represents an exchange between merchant-partner 104 and end user 108. In the example shown, merchant-partner 104 provides end user 108 with a user-interface to purchase goods/services. For example, the merchant may provide the user with a "checkout" experience over: a webpage on a merchant's website; an interface on a mobile device; an interactive voice system over a telephone network; or any interface equivalent thereto. While known customer user interfaces may provide a "checkout" experience that allows an end user to enter their credit card information, the system shown in FIG. 1 provides the end user with a checkout experience that allows the end user to pay for the goods/services in cash (or cash equivalents).

If the end user selects to pay in cash, then merchant-partner 104 interfaces and exchanges information with service provider 102, as represented by process flow 124, 126. In practice, merchant-partner 104 and/or service provider 102 stages an order by linking a set of one or more order instructions to end user 108. The order instructions may vary, but generally include instructions on what actions (e.g., payments) need to be performed by end user 108 in order for merchant-partner 104 to provide end user 108 with the agreed upon goods/services (e.g., item 110). The order instructions may include actions to be performed by the end user 108, merchant-partner 104, service provider 102, or any combination thereof.

Service provider 102 then "tokenizes" the staged order by linking the set of one or more order instructions to a token ID. (The terms "token," "token ID," "unique payment identifier," and "PID" are used interchangeably herein.) In an alternative embodiment, a single token ID can be linked to multiple staged orders and/or multiple merchant-partners. Moreover, the multiple staged orders may be staged at different times or staged as a group, for example. The token ID is then provided to end user 108. The token ID can be provided to the end user 108 either directly from service provider 102, or via POS 106 or merchant-partner 104. When end user 108 is ready to make a payment, end user 108 presents the token ID to POS 106, along with an appropriate payment, as represented by process flow 128. At POS 106, the token ID serves as a means of linking the end user's payment to the one or more order instructions.

When end user 108 presents the token ID and payment to POS 106, the token ID is used to route the presentment information to service provider 102, as represented by process flow 130, 132. Service provider 102 may then validate that the presentment was in accordance with the order instructions linked to the token ID. If the end user's payment is in accordance with the order instructions linked to the token ID, then service provider 102 notifies merchant-partner 104 that a payment has been made. Merchant-partner 104 then completes the order by, for example, shipping item 110 or otherwise fulfilling the order and/or crediting end user's 108 account with merchant-partner 104. Service provider 102 then settles the transaction or order between merchant-partner 104 and POS 106 by receiving the payment funds (minus any agreed upon service fees) from POS 106, and delivering the payment funds (minus any agreed upon service fees) to merchant-partner 104.

In an alternative embodiment, the systems and methods described herein do not require merchant-partner 104 to provide end user 108 with a checkout experience. There is also no requirement that the end user provide an intent or selection of a cash payment option. For example, in one embodiment, merchant-partner 104 provides its customers with one or more tokens as a means for the customers to make payments. As another example, the merchant provides an invoice or token document embodying a token (e.g. a barcode) to its customer or customers. The payments can be made at a POS terminal, and a series of staged orders may proceed to completion without further involvement by the end user or customer.

Figure 2:
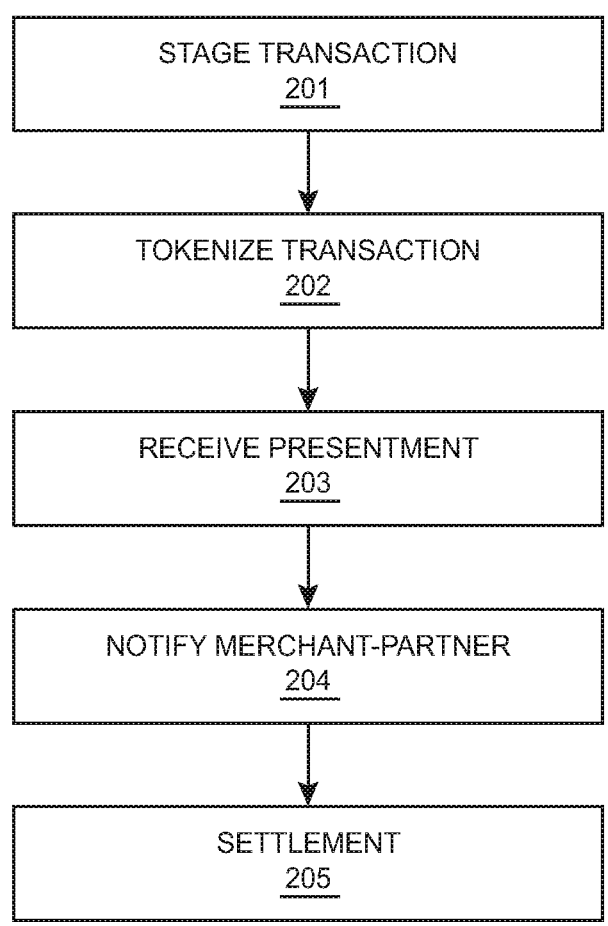
FIG. 2 is a high-level flowchart illustrating a method for facilitating orders, in accordance with one embodiment presented herein.

FIG. 2 is a high-level flowchart illustrating a method 200 for facilitating an order between a merchant and a customer, in accordance with one embodiment presented herein. More specifically, FIG. 2 is a flowchart generally illustrating the steps performed in the system described in FIG. 1. The method includes: (a) staging an order (step 201); (b) tokenizing the staged order (step 202); (c) receiving the presentment (step 203); (d) notifying the merchant-partner that the presentment has been received (step 204); and (e) settling the order between the parties (step 205). Additional details for steps (a)-(d) are provided in U.S. application Ser. Nos. 13/123,067 and 13/087,271.

Figure 3:
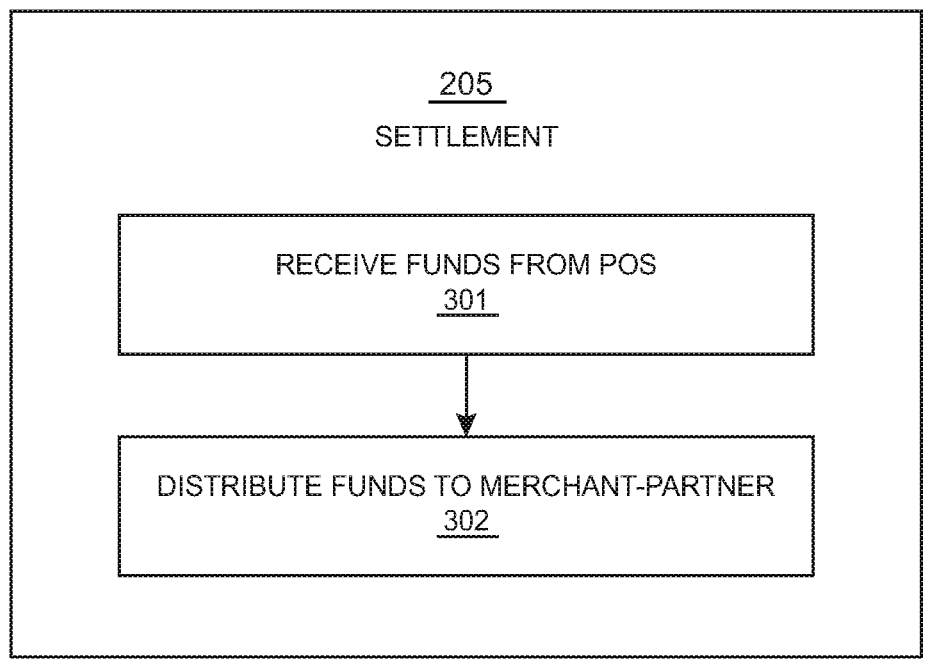
FIG. 3 is a flowchart illustrating an aspect of the method of FIG. 2.

FIG. 3 is a flowchart illustrating the steps of settlement 205, in accordance with one embodiment. In step 301, the service provider receives funds from the POS terminal. In step 302, the service provider distributes funds to the merchant-partner. Receipt and distribution of funds may involve direct and indirect transfers, and may also involve entities interposed between the service provider and the POS terminal or the service provider and the merchant-partner.

In an alternative embodiment, the steps may be reversed in order to meet the settlement requirements of the various parties. The timing of the performance of steps 301 and 302 can also be modified in accordance with the settlement requirements of the various parties. Further, the service provider may adjust the amounts received and/or distributed in accordance with a contractual agreement between the parties. As used herein the phrases "receive funds from POS terminal" and "distribute funds to the merchant-partner" do not require direct communications/transfers between individual entities. Settlement also does not require the actual "touching" of funds. For example, as used herein, to "settle the transaction (or order) between the point-of-sale terminal and the merchant-partner" means to: transfer funds; direct funds; provide an interface for the transfer of funds; and/or otherwise provide the necessary instructions to make sure the funds are properly directed from one entity to another. Further, to "settle the transaction (or order) between the point-of-sale terminal and the merchant-partner" includes communications/transfer with any and all centralized or hierarchical entities that receive funds from individual POS terminals and/or POS back offices at the closing of a defined time period (e.g., a banking day).

Figure 4:
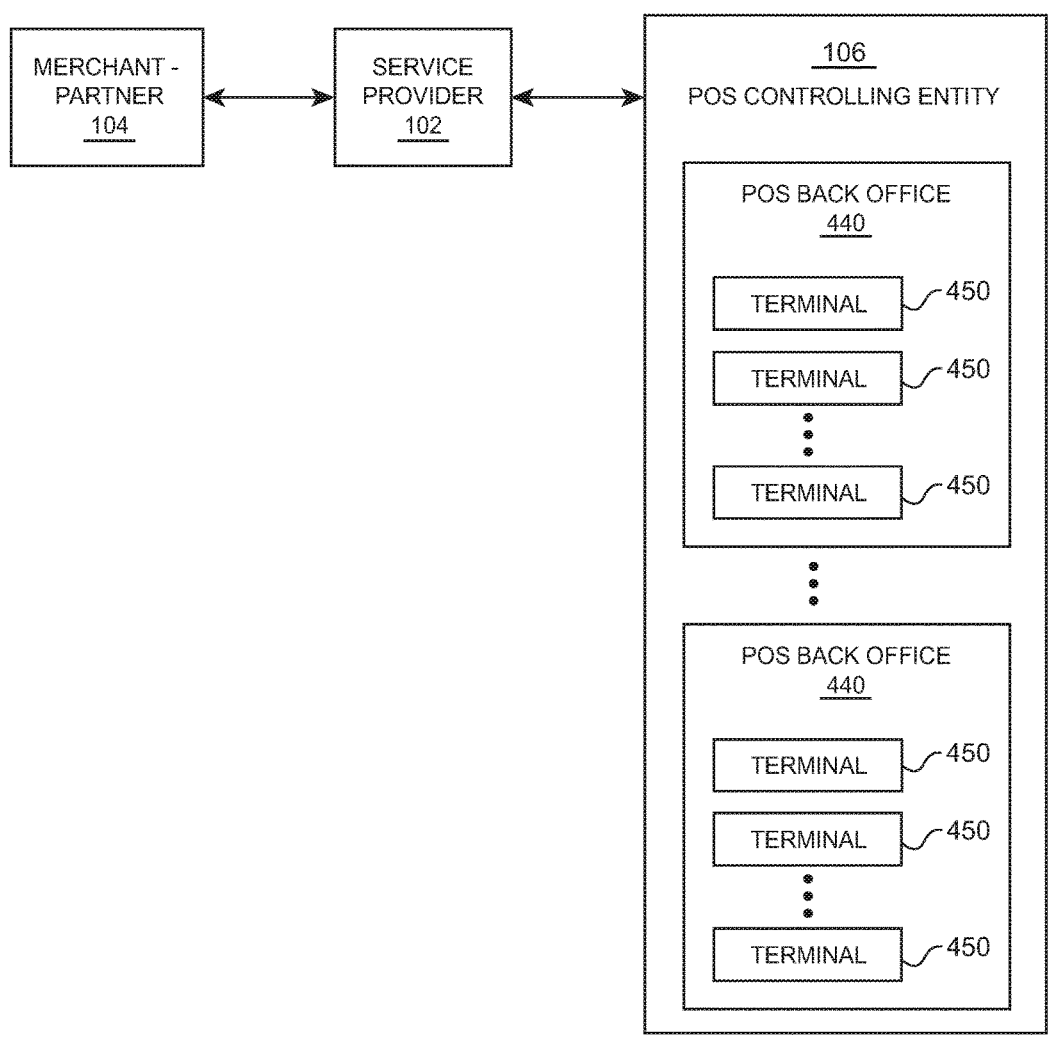
FIG. 4 is a high-level process chart illustrating one aspect of an embodiment
Figure 5:
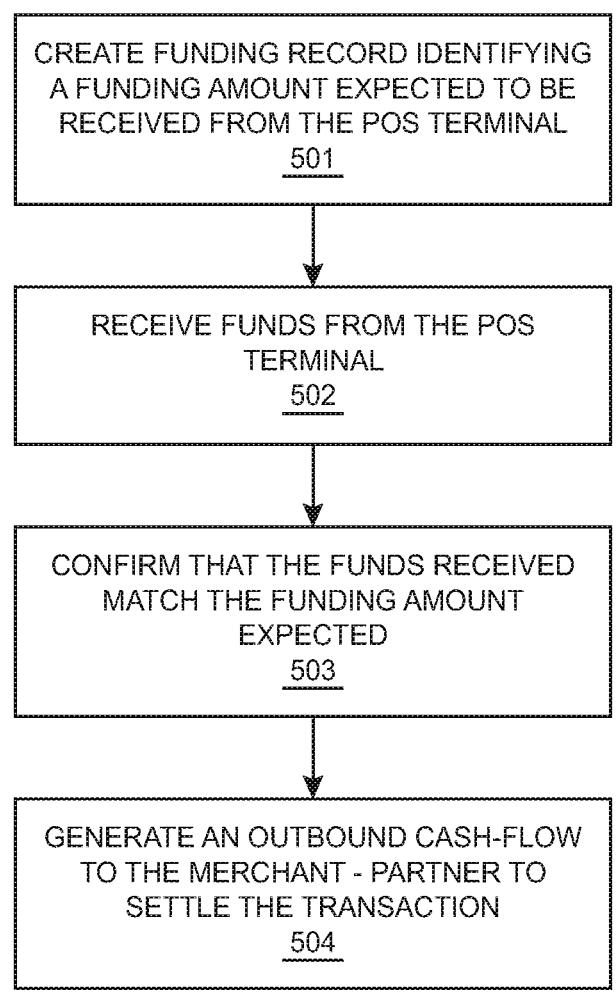
FIG. 5 is a flowchart illustrating an embodiment.

FIGS. 4 and 5 illustrate an alternative embodiment of the settlement process. FIG. 4 illustrates how, in principle, there is a linear relationship between merchant-partner 104, service provider 102, and POS 106. In practice, however, POS 106 may be a centralized controlling entity overseeing a plurality of POS back offices 440 or a centralized entity facilitating operation of a plurality of POS locations, for example. Each POS back office or location, in turn, controls a terminal or a plurality of terminals (e.g., cash registers or POS terminals) 450 where end users 108 present payment. Because of the variability in (a) when a terminal 450 is officially "closed" or "reconciled" for a given time-period and (b) when a back office 440 is officially closed or reconciled for a given time-period, there is potentially a significant amount of variability in when the actual funds for a particular order are pushed up from a terminal 450, through the POS 106 system, and out to service provider 102. In other words, rarely will service provider 102 receive funds from POS 106 in chronological or matching order with respect to received presentment data, and service provider 102 may not be able to expect chronological or matching order. As such, a settlement process at service provider 102 was engineered to deal with the randomness of terminal 450 closings and back office 440 closings.

FIG. 5 is a flowchart illustrating one embodiment of the settlement process 205. In step 501, a funding record is created to identify a funding amount expected to be received from the POS terminal (or POS 106 generally). For example, service provider 102 may maintain a database with records identifying the presentment data for each order processed through POS terminal 450. Each presentment data point will thus have a respective funding amount expected. In step 502, funds are received from the POS terminal. As mentioned above, the randomness of terminal closings and back office closings creates randomness in the order for which funds are actually received at service provider 102. As such, funds received must be reconciled with the funding amounts expected. In one embodiment, funds are received from POS 106 with a line-item detail file identifying the specific orders that are actually being funded. In step 503, service provider 102 reconciles and/or confirms that the funds received match the funding amounts expected. In other words, service provider 102 tests the line-item detail file received from POS 106 against the funding records of step 501. Moreover, the line item detail file may originate with various entities (e.g. the POS terminal, a controlling entity, a payment processor, etc.) in some embodiments, and such files may be created or processed by multiple entities. As such, service provider 102 can identify which orders have been actually funded, and thus which orders should be paid to merchant-partner 104. In step 504, an outbound settlement is generated to merchant-partner 104 to settle the funded orders. In one embodiment, step 504 is performed only after step 503.

In another embodiment, orders are generally paid (e.g. outbound cash-flow is generated to merchant-partner) before orders have been actually funded. Thus, in such an embodiment, step 504 may be performed prior to step 503 for some merchant-partners and/or POS terminals. This may result in further settling or reconciliation of accounts and additional statements to resolve inaccuracies resulting from the need to provide funding to the merchant-partner at step 504 in advance of the transfer of step 503.

Moreover, in some embodiments, a payment location or an intermediary may be invoiced by the payment processor, rather than receiving payments and associated payment information from the payment location on a proactive basis. Additionally, entities may be interposed in this process. This may involve typical commercial actors facilitating funds transfers (e.g. banks). This may also involve entities specific to the type of orders and transactions contemplated here, wherein the entities may facilitate a process of allowing for acceptance of cash payments for transactions for which a merchant is not equipped or not well-equipped to handle cash transactions.

In one embodiment, there is provided a method of settling an order between a POS terminal and a merchant-partner, wherein the POS terminal receives presentment of a payment for the merchant-partner from an end user, the method comprising: (a) receiving confirmation that an end user has presented, to a POS terminal, a payment for a merchant-partner; (b) authorizing the POS terminal to accept the payment from the end user; (c) creating a funding record identifying a funding amount expected to be received from the POS terminal; (d) receiving funds from the POS terminal; (e) confirming that the funds received in step (d) match the funding amount expected from step (c); and (f) generating a settlement of funds to the merchant-partner to settle the order. Step (f) may be performed only after step (e). Step (c) may be performed before step (b). The method may further comprise: (1) asserting to the merchant-partner what amount is owed to the merchant-partner; and/or (2) asserting to the merchant-partner when the amount owed will be released to the merchant-partner. The method may further comprise, after step (c): (1) receiving a line-item detail file from the POS terminal; and (2) reconciling the line-item detail file with the created funding record. The line-item detail file may be a non-chronological database of POS terminal orders. Moreover, the line-item detail file may originate with various entities (e.g. the POS terminal, a controlling entity, a payment processor, etc.) in some embodiments, and such files may be created or processed by multiple entities. Step (d) of the method may further comprise, receiving funds from the POS terminal via a centralized controlling entity, wherein the centralized controlling entity serves as a transaction or order hub for a plurality of POS terminals.

In still another embodiment, there is provided a method of facilitating an order, the method comprising: (a) tokenizing an order by linking one or more order instructions a token ID; (b) providing an end user with the token ID; (c) receiving confirmation that the end user has presented, to a POS terminal, the token ID and a payment in accordance with the one or more order instructions; (d) notifying a merchant-partner that the end user has provided the payment to the POS terminal; and (e) settling the funds for the payment associated with the order between the POS terminal and the merchant-partner by (1) creating a funding record identifying a funding amount expected to be received from the POS terminal, (2) receiving funds from the POS terminal, (3) confirming that the funds received in step (2) match the funding amount expected from step (1), and (4) generating a settlement of funds to the merchant-partner to settle the order. Step (4) may be performed only after step (3), and step (4) may involve an intermediary, such as a bank, for example. After step (c), the method may further comprises: (1) asserting to the merchant-partner what amount is owed to the merchant-partner; and/or (2) asserting to the merchant-partner when the amount owed will be released to the merchant-partner. Step (e) may further comprise: (1) receiving a line-item detail file from the POS terminal; and (2) reconciling the line-item detail file with the created funding record. The line-item detail file may be a non-chronological database of POS terminal transactions or orders. Moreover, the line-item detail file may originate with various entities (e.g. the POS terminal, a controlling entity, a payment processor, etc.) in some embodiments, and such files may be created or processed by multiple entities. Step (e)(2) may further include receiving funds from the POS terminal via a centralized controlling entity, wherein the centralized controlling entity serves as a transaction or order hub for a plurality of POS terminals.

Figure 6:
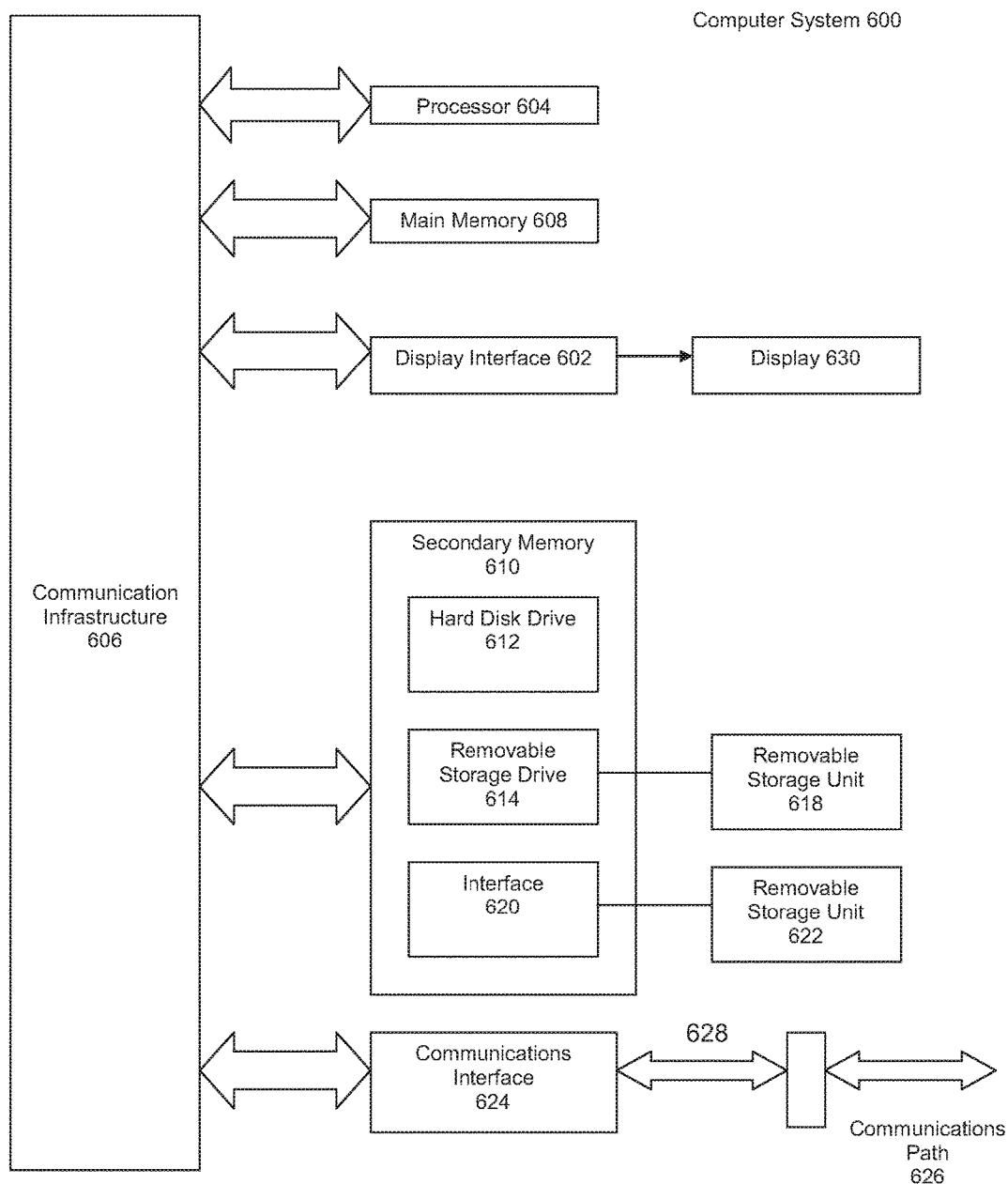
FIG. 6 is a schematic drawing of a computer system used to implement the methods presented herein.

In some embodiments, the system or process is directed toward one or more computer systems capable of carrying out the functionality described herein. For example, FIG. 6 is a schematic drawing of a computer system 600 used to implement the methods presented above. Computer system 600 includes one or more processors, such as processor 604. The processor 604 is connected to a communication infrastructure 606 (e.g., a communications bus, cross-over bar, or network). Computer system 600 can include a display interface 602 that forwards graphics, text, and other data from the communication infrastructure 606 (or from a frame buffer not shown) for display on a local or remote display unit 630.

Computer system 600 also includes a main memory 608, such as random access memory (RAM), and may also include a secondary memory 610. The secondary memory 610 may include, for example, a hard disk drive 612 and/or a removable storage drive 614, representing a floppy disk drive, a magnetic tape drive, an optical disk drive, flash memory device, etc. The removable storage drive 614 reads from and/or writes to a removable storage unit 618. Removable storage unit 618 represents a floppy disk, magnetic tape, optical disk, flash memory device, etc., which is read by and written to by removable storage drive 614. As will be appreciated, the removable storage unit 618 includes a computer usable storage medium having stored therein computer software, instructions, and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow computer software, instructions, and/or data to be transferred from the removable storage unit 622 to computer system 600.

Computer system 600 may also include a communications interface 624. Communications interface 624 allows computer software, instructions, and/or data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, a radio frequency (RF) link, a wireless communication link, and other communications channels. Communications interface 624 may be implemented using custom or proprietary protocols and hardware (e.g. Lightning or Thunderbolt originated by Apple or Intel) or using various standards-based protocols and related hardware, such as Universal Serial Bus (USB) protocols, IEEE 1394 standards-based protocols, or other protocols for data transfer.

In this document, the terms "computer-readable storage medium," "computer program medium," and "computer usable medium" are used to generally refer to media such as removable storage drive 614, removable storage units 618, 622, data transmitted via communications interface 624, and/or a hard disk installed in hard disk drive 612. These computer program products provide computer software, instructions, and/or data to computer system 600. These computer program products also serve to transform a general purpose computer into a special purpose computer programmed to perform particular functions, pursuant to instructions from the computer program products/software. Various embodiments are directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the various embodiments, as discussed herein. In particular, the computer programs, when executed, enable the processor 604 to perform the features of the presented methods. Accordingly, such computer programs represent controllers of the computer system 600. Where appropriate, the processor 604, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 600 using removable storage drive 614, interface 620, hard drive 612, or communications interface 624. The control logic (software), when executed by the processor 604, causes the processor 604 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

Various embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium, having instructions executable by at least one processing device that, when executed, cause the processing device to: (a) receive confirmation that an end user has presented, to a POS terminal, a payment for a merchant-partner; (b) authorize the POS terminal to accept the payment from the end user; (c) create a funding record identifying a funding amount expected to be received from the POS terminal; (d) receive a line-item detail file identifying funds delivered from the POS terminal; (e) reconcile the line-item detail file with the funding record of step (c); and (f) generate an outbound payment to the merchant-partner to settle the order. The line-item detail file may be a non-chronological database of POS terminal transactions or orders. Moreover, the line item detail file may originate with various entities (e.g. the POS terminal, a controlling entity, a payment processor, etc.) in some embodiments, and such files may be created or processed by multiple entities. The computer-readable storage medium may further include instructions executable by at least one processing device that, when executed, cause the processing device to (1) notify the merchant-partner of an amount that is owed to the merchant-partner; (2) notify the merchant-partner of when the amount owed will be released to the merchant-partner; and/or (3) receive funds from the POS terminal via a centralized controlling entity. The centralized controlling entity may serve as a transaction or order hub for a plurality of POS terminals.

In still another embodiment, there is provided a computer base system having: (a) means for receiving confirmation that an end user has presented, to a POS terminal, a payment for a merchant-partner; (b) means for authorizing the POS terminal to accept the payment from the end user; (c) means for creating a funding record identifying a funding amount expected to be received from the POS terminal; (d) means for receiving funds from the POS terminal; (e) means for confirming that the funds received match the funding amount expected; and (f) means for generating a settlement of funds to the merchant-partner to settle the order.

In some embodiments, information available at the time of staging a transaction may be limited, or may come from multiple sources presenting potentially conflicting information. For a situation involving a series of long-term, established stable relationships, this may not be terribly important. However, for a situation where relationships with entities change frequently along a chain involved in fulfilling an order, this may create challenges. It may, for example, be necessary to handle changes to relationships between entities which are apparent from one source of information but not another information source. Thus, one may look up information about an order and find stale information, necessitating checking for additional information. Moreover, one may stage an order which is involved in some form of promotion or incentive (typically of a temporary variety), necessitating special processing of what would otherwise be a predictable and stable order processing situation. Note that checking for additional information may be as simple as receiving expected order information from a merchant about a customer and then looking up whether newer information is available to a payment processor about the merchant, customer, or related third-party prior to staging the order.

Any payment processor using a system such as that of FIG. 1 may be expected to seek to work with a large and diverse set of merchants. These merchants potentially offer all sorts of goods or services, and such services can involve economic obligations which are harder to describe, such as agreement not to foreclose on a mortgage, for example. The payment processor also may seek to work with a large and somewhat diverse set of retail sites, which accept payments. These retail sites then pass along the payments to the payment processor in some fashion.

Retail sites typically use item codes of some form to address how a specific good or service directly sold by the retailer is priced to the consumer, assigning item codes in an item management system to specific goods or services. Under a traditional approach, an item code would be needed for each new merchant's good or service as that merchant comes into the system. Additionally, different retail sites might need different item codes from other retail sites for the same merchant. Moreover, it might get difficult to simply describe items associated with item codes for some merchants, as the merchants may handle more abstract things like loan payments, rather than concrete goods, for example. This can get very unwieldy very quickly, with an $O(n^m)$ type of expansion of item codes possible. Managing this on the retail side (entering new item codes for merchants/goods/services) and on the payment processor side could easily prove impractical or intractable.

In various embodiments, the system allows a retail site to enter into its item management system an item code which points to an economic understanding (an understanding of how parties involved in an order or transaction share in the economics of that payment), rather than a specific good or service to be sold at retail. In some sense, the item may be a payment for a payment processor made under a certain economic arrangement. However, the item code associated with the payment does not refer to a specific good (or service). Thus, one can use the item code to make a payment on anything (or nearly anything) a payment processor processes payments for, provided that item code distinctly represents the appropriate economic structure for that and similar goods or services. The payment processor may be expected to use an item code along with other portions of a token, such as a ticket identifier or other reference to an order in the payment processor system to process the payment and match the payment with an appropriate order. The item code may actually be used only by the retail site or POS in some embodiments.

Figure 7A:
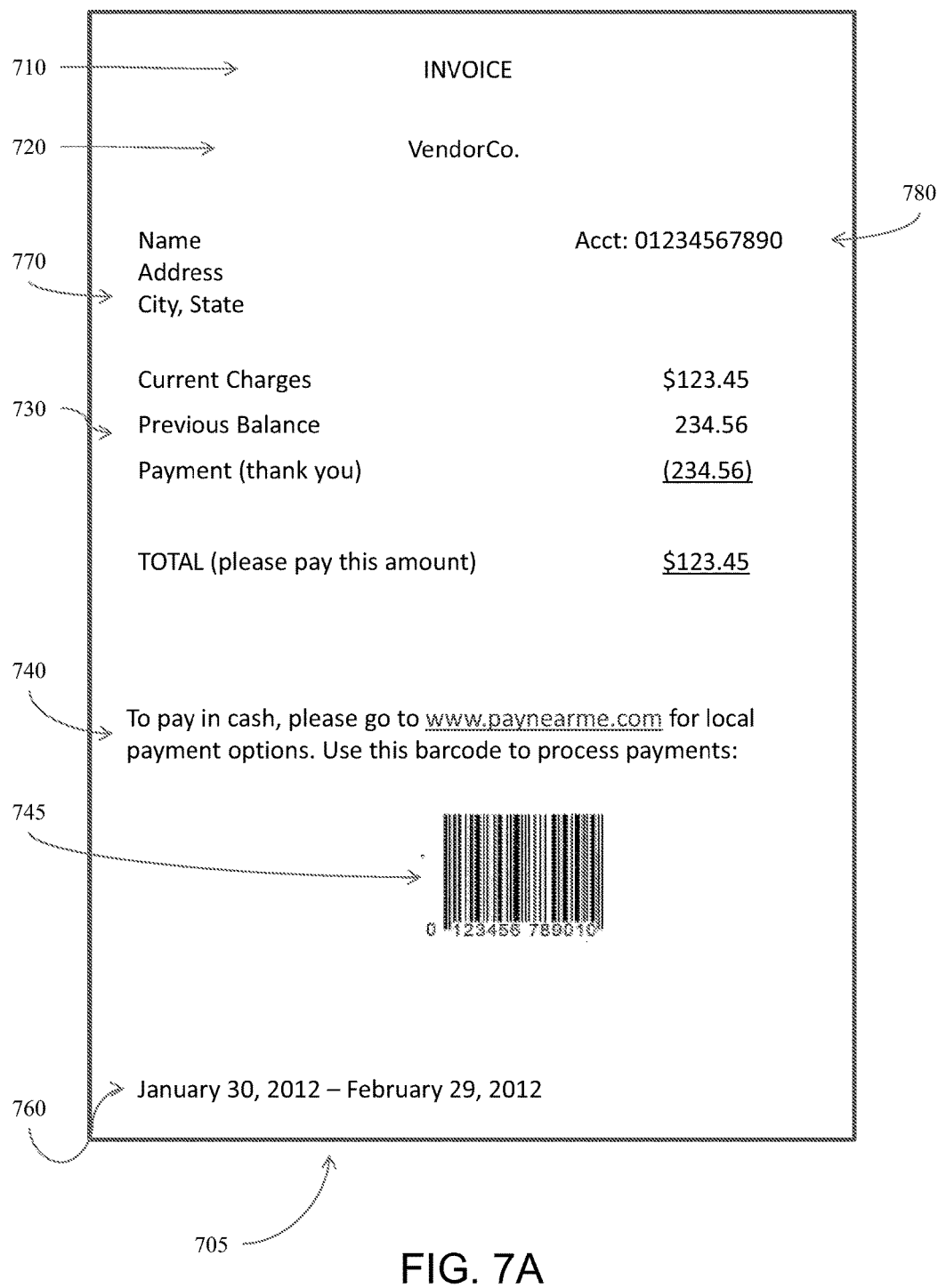
FIG. 7A illustrates an embodiment of an invoice.

To consider one aspect of how this process may ultimately proceed, one may take an invoice or bill to a POS terminal (such as at a retail establishment) in order to pay the invoice. FIG. 7A illustrates an embodiment of an invoice. Invoice 705 provides basic information which may be used to allow a customer to pay a merchant. Invoice 705 illustrates an example of an invoice received by a customer or provided by a merchant or vendor may look like. However, variations on invoices are potentially infinite. Invoice 705 may be used as a token document incorporating a token or token ID in conjunction with the system of FIG. 1, for example (the token or token ID may be perceptible to humans, or encoded in some manner, such as through a barcode, for example). A vendor or merchant (e.g. a merchant-partner) may issue invoice 705 (e.g. an invoice or bill for goods or services) and allow a customer to use a POS terminal at a local location (e.g. a local store) to pay for invoice 705. Along with issuance of invoice 705, the merchant or vendor may be expected to stage an order with a payment processor associated with invoice 705, such that a consumer or customer may then take invoice 705 in for payment and use the system of FIG. 1 to accomplish payment for goods or services.

Invoice 705 includes a title 710 indicating that it is an invoice and an originator 720 indicating which vendor or merchant the invoice came from. Address block 770 and account number 780 provide information about a customer and an account the customer has with merchant 720. Payment information 730 provides information about current charges and the amount owed by the customer. Announcement 740 provides information about how the invoice may be paid. Barcode 745, in an embodiment, provides an encoded form of information about the type of order and the specific order, or other information related to the order associated with invoice 705. Some examples of such information are provided below, but other variations may also be used. Billing period 760 provides an indication of what period of time is represented by the invoice. Note that variations may be used for all aspects of invoice 705. One may only show part of an account ID 780, with the rest masked or omitted, for example. Similarly, one may leave off a title 710 or time period 760, for example.

Figure 7B:
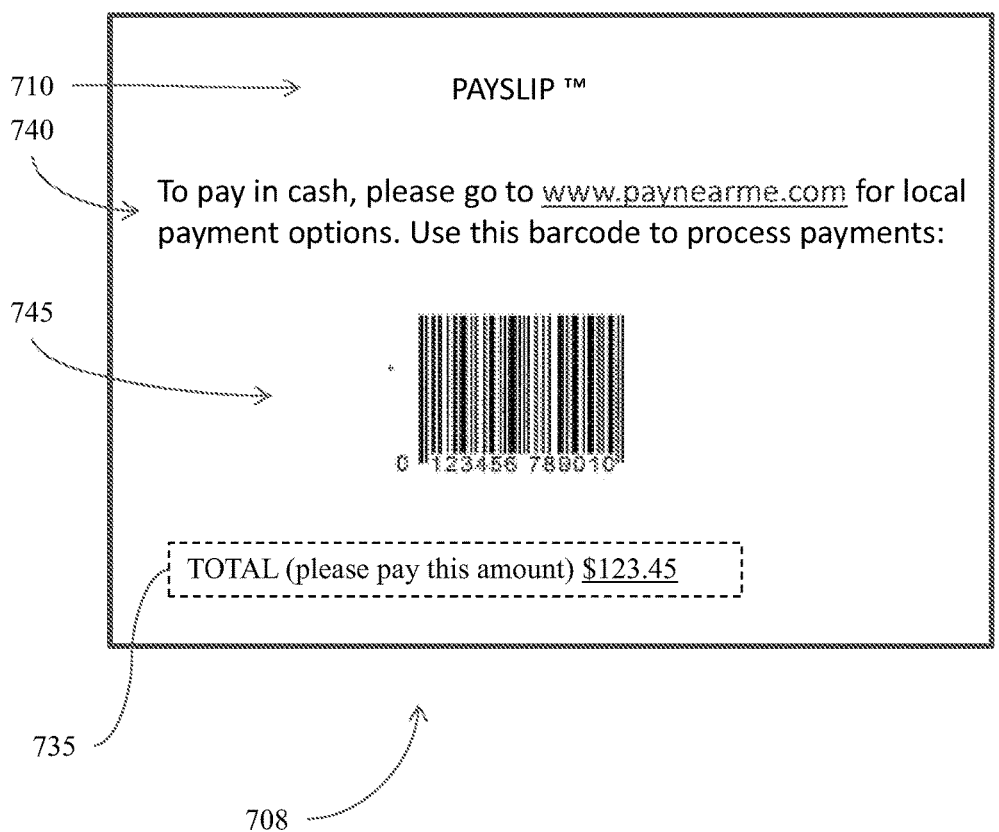
FIG. 7B illustrates an embodiment of a token document.

FIG. 7B illustrates an embodiment of a token document. Thus, FIG. 7B illustrates an alternative form of an invoice (token document 708) which may be used in other contexts from invoice 705. Barcode 745 may be used to arrange for payment of invoice 708 through use of a POS terminal, for example. Total 735 may optionally be included in token documents for specific amounts, and in some contexts may be provided in a more informal or handwritten form, for example. In other contexts, token document 708 may allow for the payment of any amount, and total 735 may simply be left off of the document. Token document 708 generally provides many of the same aspects in an order that invoice 705 provides, with a different visual format. Thus, token document 708 may be expected to be associated with some form of order staged with a payment processor by a merchant or vendor. In the case of a situation where token document 708 is provided at initiation of an order, one may expect that some form of order has previously been staged by or for the merchant, such as when the merchant agreed to use token document 708. Some details of such an order (e.g. identity of the merchant or vendor) may be known when the merchant agrees to use the token document. Other details (e.g. identity of the consumer, amount of the payment for the order) may not be known until the order is executed, for example.

Note that an invoice, bill or token document need not be provided in physical (e.g. paper) form. One may receive such a document via email, by accessing a website, or by downloading information in a dedicated software application on a computing device, for example. Moreover, one may access such information on various different types of computing devices, such as mobile devices, personal computers, tablets, laptops, or other devices. Additionally, one may encode the relevant information in an accessible way in various media or associated structures. Thus, one can provide the relevant information from an invoice or token document in an apparatus with a magnetic stripe, NFC (near-field-communication) capabilities, RFID (radio frequency identifier) capabilities, or other structure. Similarly, one may provide such information in a variety of visible representations, such as a UPC (universal product code), SKU (shop-keeping unit), SLIN, or other encoding format on a document, whether a paper document or a document displayed on the screen of a mobile device, for example. Provided that a payment site has the capability to interact with the structure or representation in question, a payment can be processed. Note that for a document displayed on a mobile device, it may be possible to force display of an updated barcode or similar representation of an item code, token or token identifier, for example at the time of payment, thus allowing for use of updated information at that time.

Figure 8A:
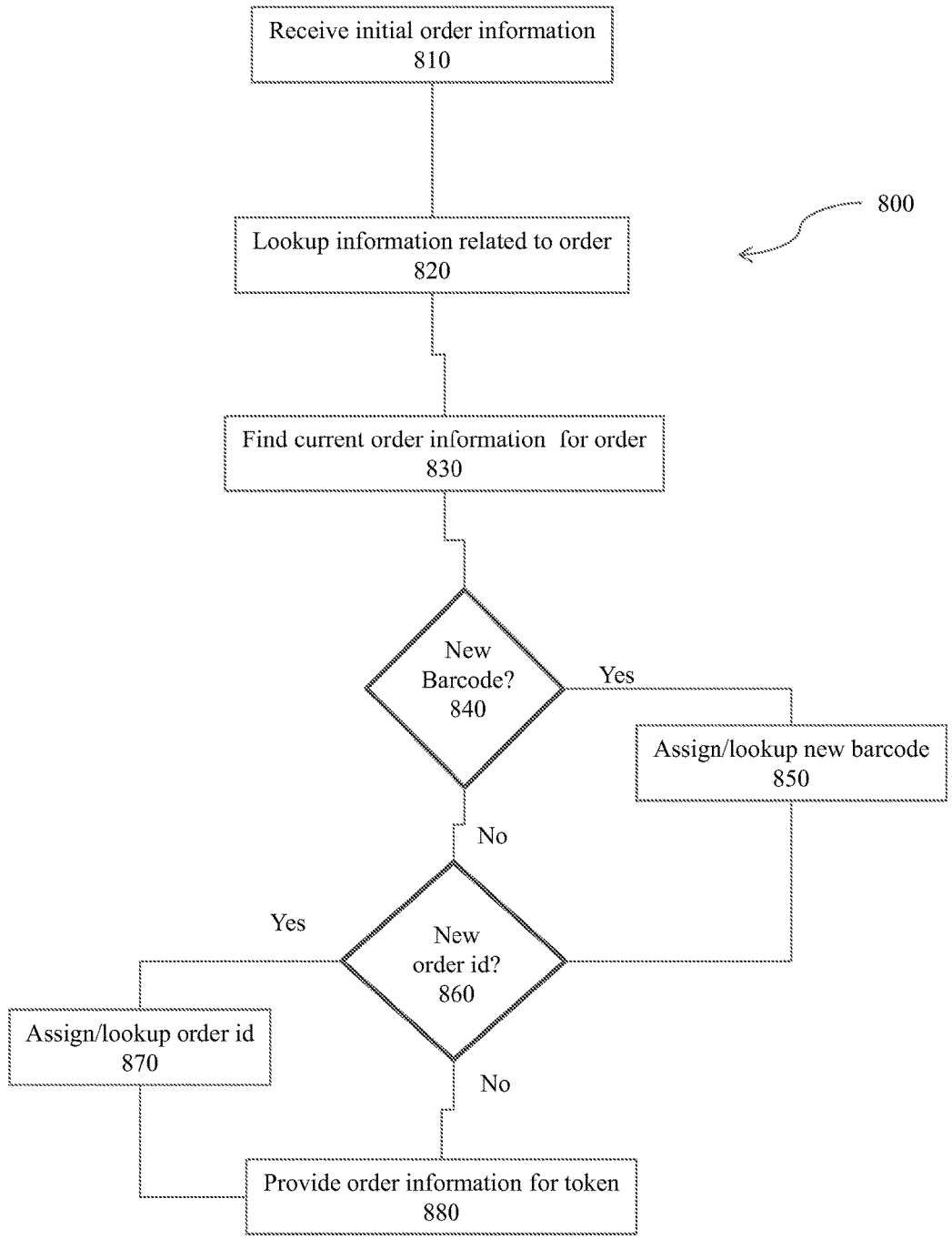
FIG. 8A illustrates an embodiment of a process of assigning and providing order information.

In order to allow for payment based on a token document of some form, one may stage an order in advance, thereby preparing to handle the payment in question when (or if) it arrives. FIG. 8A illustrates an embodiment of a process of assigning and providing transaction information for an order. Process 800 initiates with receipt of initial order information at module 810. The process then looks up information related to the order at module 820. This may involve looking up information related to a specific merchant or vendor, or information related to a specific consumer, for example. At module 830, the process finds current information for the order. Based on the information looked up at module 820 and further information found at module 830, a determination is made as to whether a new barcode is needed at module 840. If so a new barcode is assigned at module 850 (this may be expected to involve looking up an existing barcode which is new to the order, for example, but may involve creation of a barcode in some instances for some embodiments). The process then proceeds to module 860. At module 860, a determination is made as to whether a new order ID is needed. If so a new order ID is assigned at module 870 (this may involve creation of a new order ID or looking up an order ID for a previously staged order, for example). The process proceeds to module 880, where the order information is provided for the token.

Figure 8B:
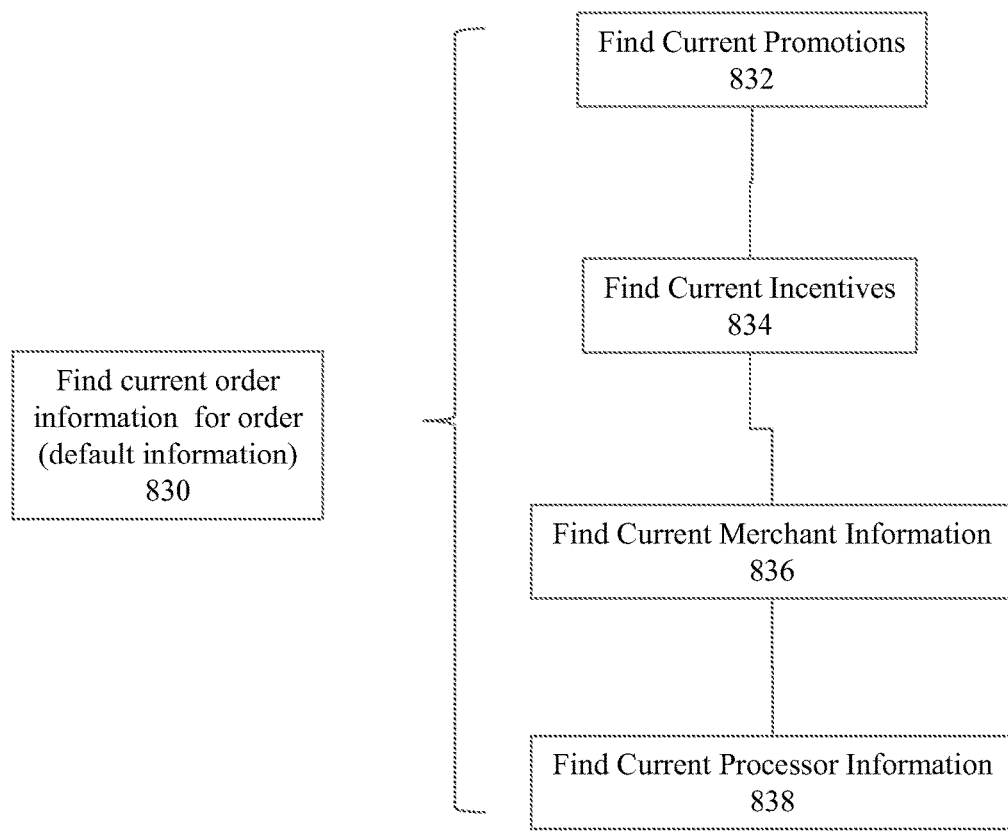
FIG. 8B further illustrates a process of finding current information for an order.

FIG. 8B further illustrates a process of finding current information for an order. Finding current information involves finding information about a wide variety of potential factors which may affect the order. Thus, one may find current promotions at module 832. One may also find current incentives at module 834. Moreover one may find current merchant information at module 836, such as updated information from a merchant which already has an existing relationship with a payment processor, for example. Additionally, one may find current processor information at module 838, which may relate to changes in how the processor is handling a given order or type of order.

While these distinctions may not ultimately apply in all cases or all embodiments, one may look at promotions as customer-related items, such as an offering to a customer. In contrast, one may look at incentives as offerings to merchants, processors, and retail sites or point-of-sale sites, for example. Thus, for purposes of this discussion, one may consider promotions as relating to customers and incentives as relating to actors within the chain other than customers or consumers. Promotions thus may take a variety of forms, including such things as offering discounts or free merchandise or reward points, for example. Incentives would typically be expected to take the form of enhanced cash payments to actors within the chain of a transaction or order, or shifts of payments between actors within the chain of a transaction. (E.g., the payment processor may choose to incent a merchant, or an intermediary may discount intermediary payments for some transactions, for example.)

Figure 9:
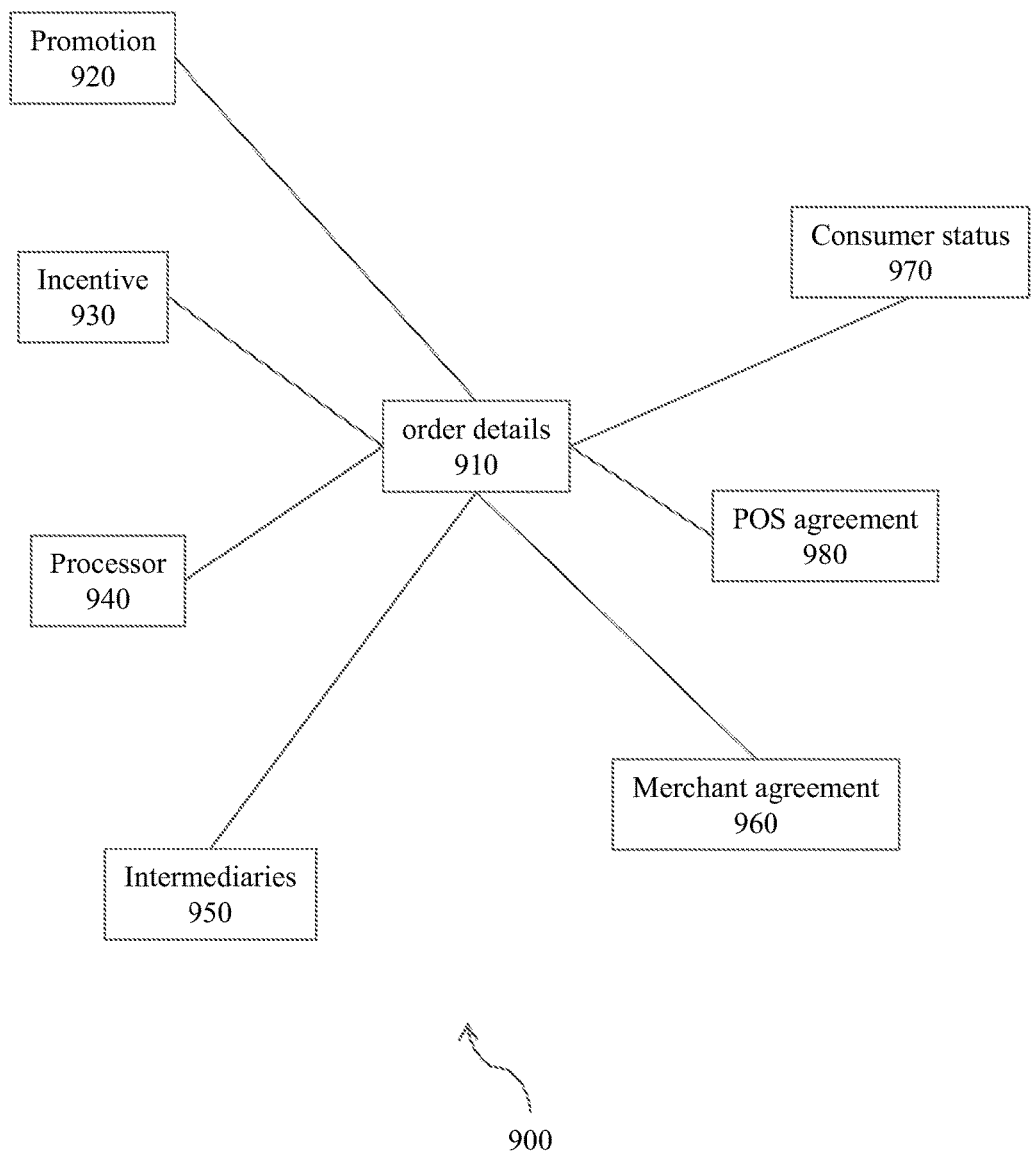
FIG. 9 illustrates factors which may provide or determine order details at initiation or the time of payment of an order in some embodiments.

Orders may be influenced by many different things. FIG. 9 illustrates factors which may provide or determine order details at initiation of an order. Order details 910 are effectively determined at the time of staging of an order, and information for looking up these factors is encoded at the time of staging of the order. Thus, one may expect order details 910 to be affected by promotions 920 and incentives 930, for example. Similarly, current status or agreements with processor 940, intermediaries 950 and merchant agreement 960, for example may also affect order details 910. Likewise, customer status 970 can affect order details 910. For example, a customer may have acquired some sort of status with a payment processor such as due to a high volume of processed payments, for example or customer status 970 may result from the status of the customer with a merchant, for example.

Moreover, when an order is paid for, additional factors may ultimately influence settlement of the order. POS agreement 980 or similar status information about where an order is paid for (or is to be paid for) may also have an effect. Thus, while one may encode an economic understanding for orders, the specific location where customer ultimately pays for an order which is staged may have a further effect on the order details, which cannot be encoded for, due to the inherent uncertainty of the process. (e.g., one may not be able to predict where the customer will go.) POS agreement 980 may be expected to be structured in advance, and may interact with an encoded set of economic understandings, or may determine which part of a set of economic understandings is invoked to handle payment of a particular order, for example. POS agreement 980 may involve something as simple as a flat fee per order, which varies from one type of POS terminal or retail location to another. POS agreement 980 may also involve something more substantial in the form of an agreement between a POS terminal or retail site and a payment processor, and may evolve or transform at times as well.

Note that when staging orders, a merchant or vendor may stage a single order or multiple orders (e.g. a plurality of orders) at one time. Moreover, this may involve some form of batch or bulk processing and creation of token IDs or tokens, for example. Additionally, there may be multiple tokens or token IDs for an order, based on different types of payment processors, for example. Similarly, there may be situations where multiple tokens are generated for an order to allow for selection of a specific token by a merchant when the order information is provided to a consumer. Thus, a merchant may receive a token with a promotion and a token without a promotion (each token corresponding to a different economic understanding) and the merchant may choose which token to provide to the consumer, thus allowing the merchant to control promotions. Similar options may be provided for incentives or types of incentives, for example. Alternatively, a merchant and payment processor may choose to have the payment processor decide which orders should receive tokens with promotions, for example, and this may allow the merchant to emphasize the unpredictable nature of a promotion (e.g. "You may have already won!") whether a consumer has received a promotion or not.

Types of orders that may be staged vary greatly. For example, one may stage a straightforward order for pickup or delivery of goods from a merchant, and arrange for payment thereby. Alternatively, one may stage an order or series of orders for a service from a merchant. As another example, one may stage an order or series of orders for an ongoing service (e.g. provision of power to a residence, for example). Moreover, one may stage an order or series of orders for a more abstract obligation, such as repayment of a mortgage (or loan) and a corresponding agreement to not foreclose on mortgaged property (or seize secured property), for example.

In general, in staging an order, one may expect to at least have identification of the merchant staging the order, an expiration date for the order, an amount for the order, and a unique identifier within a merchant system for the order to be staged. The expiration date may be a date after which payment will not be accepted for the order, for example, and may be more precise or granular than a date (e.g. a date and time). The amount of the order may be something in the form of a range rather than a single number in some instances and some embodiments. The unique identifier within the merchant system is something that allows the merchant to track the order internally, and thereby to determine within a merchant system what order has been fulfilled, what consumer has fulfilled consumer obligations, etc.

One example of what may influence an order in the form of an economic understanding is a schedule of fees. FIG. 10 illustrates an embodiment of a schedule of fees. The schedule of fees illustrated provides one example of how a fee may be determined for orders. Thus, one may expect that an order which is the first through the 10th order may have a corresponding fee of $0.50 for a retail site or POS terminal, for example. Orders which are the 11th through the 100th order for a given time period may have a higher corresponding fee of $0.60. Similarly orders 100 through 999 may achieve yet a higher fee of $0.70, for example. Orders 1000 through 9999 may provide yet a higher fee of $0.80, for example. Moreover, orders 10,000 and beyond may provide the highest fee of $0.90, for example. This provides a relatively simplistic example of how one may determine a fee based on the number of orders processed by a single retail location or by a processor, for example. Much more complicated versions may be agreed to between the payment processor and various entities involved in processing orders or facilitating agreements to process orders, for example. Moreover, such a schedule may be expected to apply to a predetermined time period, such as a month or fiscal quarter, for example.

Figure 11A:
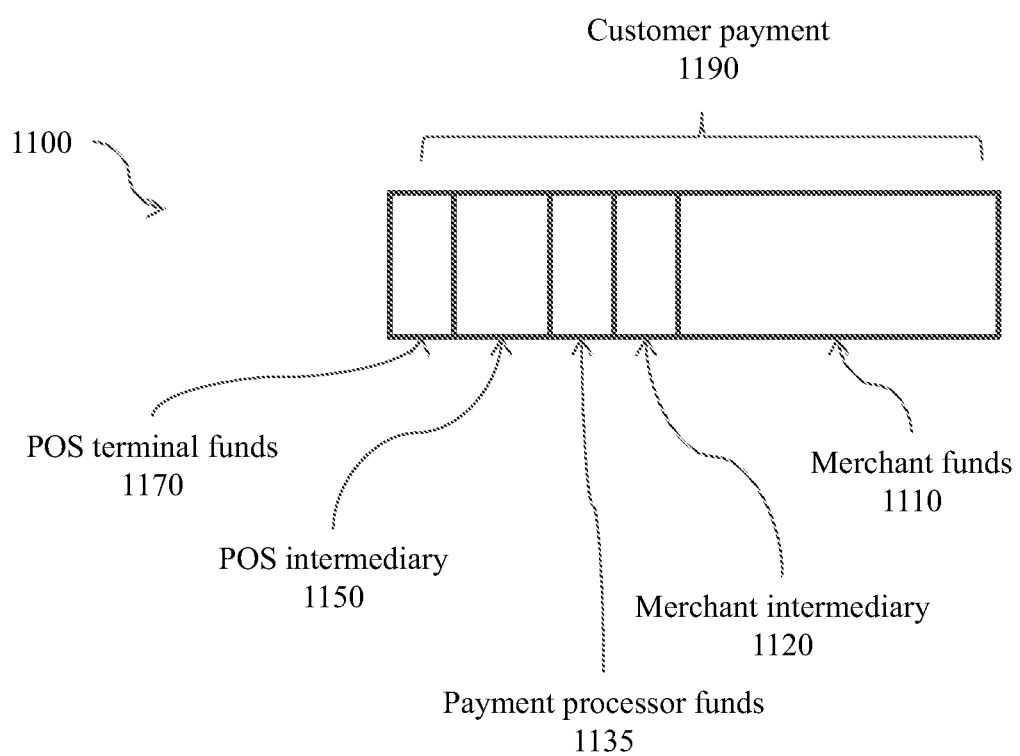
FIG. 11A illustrates an example division of funds in an embodiment.

In general, an economic understanding ultimately specifies where funds from a payment go. FIG. 11A illustrates division of funds from one perspective. Customer payment 1190 is shown as the whole of the payment made by the customer. POS terminal funds 1170, POS intermediary funds 1150, payment processor funds 1135, and merchant intermediary funds 1120 are all shown as slices or takes of funds contained within customer payment 1190 which are taken out to arrive at funds ultimately transferred to merchant in the form of merchant funds 1110. Thus, one may understand that rather than representing a transfer through an entity, the funds are actually funds which are allocated to an entity or group of entities as part of the process of ultimately transferring funds from the customer to a vendor or merchant.

Figure 11B:
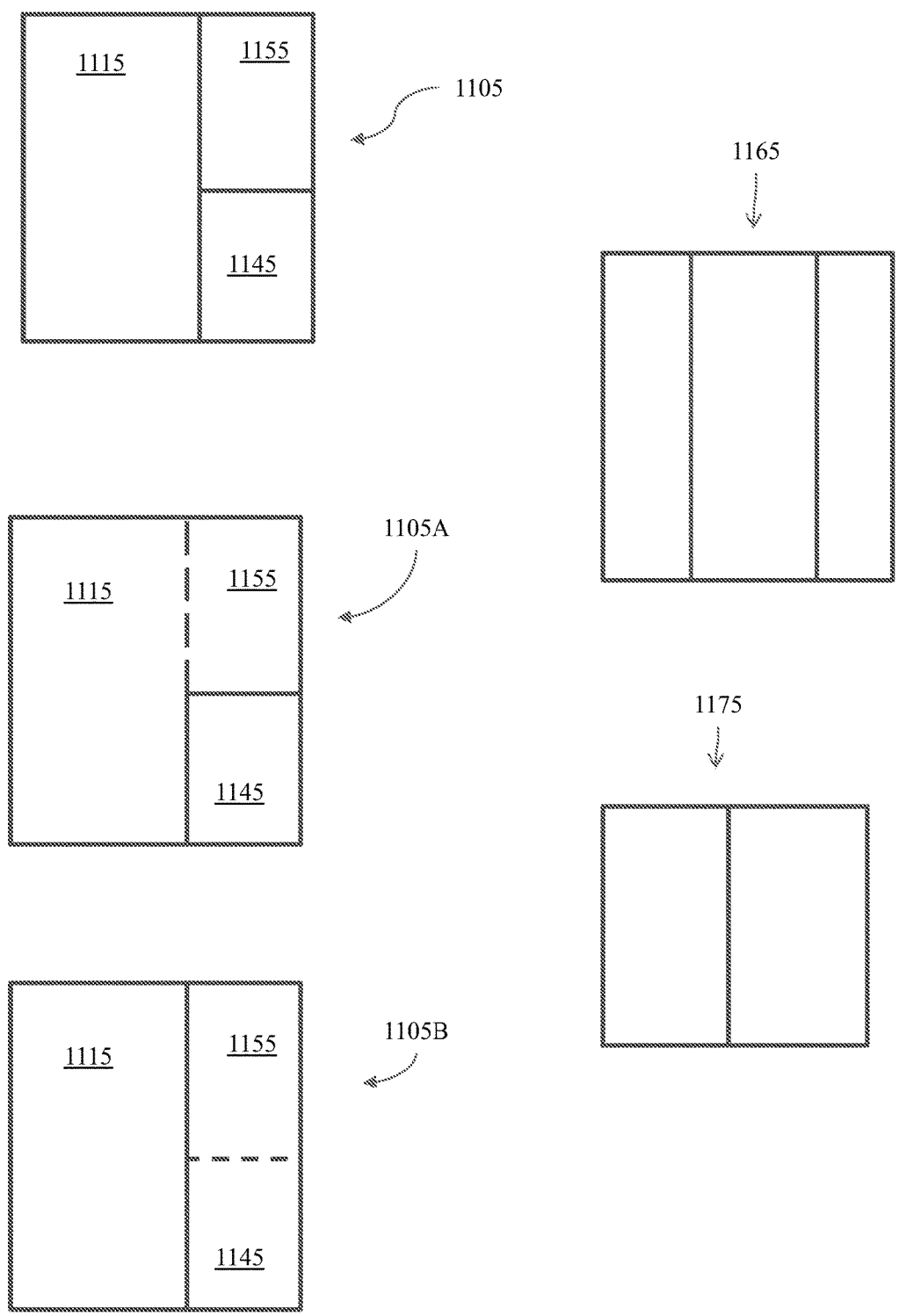
FIG. 11B illustrates an example of division of funds from a different perspective in an embodiment.

FIG. 11B illustrates other aspects of funds division or takes from a payment which may be involved in fulfilling some orders and handling payment thereof. Structure 1105 illustrates payment portions as they may be understood for a specific payment. Portion 1115 refers to a merchant portion of a payment structure 1105. Portion 1145 refers to a payment processor portion of the payment 1105. Portion 1155 refers to the payment processor portion or take of payment 1105. As illustrated with respect to structure 1105A, a retail site may only be aware of retail portion 1145, and may not see the distinction between merchant portion 1115 and payment processor portion 1155, for example. Similarly, as illustrated with respect to structure 1105B, a merchant may only be aware of merchant portion 1115 and the total amount of the collective amounts of portions 1145 (retail) and portions 1155 (payment processor).

Structure 1165 illustrates how any of portions 1115, 1145 and 1155 may be further subdivided into three parts for various parties, for example. Similarly, structure 1175 how any of portions 1115, 1145 and 1155 may be further subdivided into two parts for various parties, for example. More than two or three parties may also be involved in some situations where division of part of the payment is to take place. Additionally visibility to one actor in the system may not involve visibility to another actor. Thus, a payment processor may only know that a portion of funds are going to a retail site, without knowing what portion of the funds to the retail site further goes to a third-party aggregator or facilitator, for example, as described with respect to 1105A. Similarly, the retail site may not be able to determine how funds are split up, as described with respect to 1105B.

The division of funds or economic understanding of FIG. 11A or FIG. 11B is referenced by a combination of the item code and the ticket identifier or other representation referring to an order in a token identifier or token document. It may be expected that the item code references an economic understanding which indicates what funds will go to the retail site processing a payment, and may further specify a markup to a regular amount of funds to be charged when accepting payment. Note that the markup need not correlate well with the amount of funds to go to the retail site, for example.

The item code may reference a specific economic understanding for some parties, whereas the ticket identifier or the portion of the token identifier which refers to an order indicates the remaining relevant understandings for other parties, through reference to the order. This allows for both specifications of economic understandings with a retail site through an item code, regardless of the underlying item to be paid for, and specification of economic understandings for other actors through reference to the order and attachment of references to these economic understandings in the order as maintained by the payment processor. The order may, for example, specify a payment plan (directly or by reference), which refers to or specifies associated economic understandings. This further allows for reporting to a merchant about what was sold and to a retail site about what types of actual goods, services or other obligations of a merchant (e.g. loan payments) were paid for at the retail site.

Figure 11C:
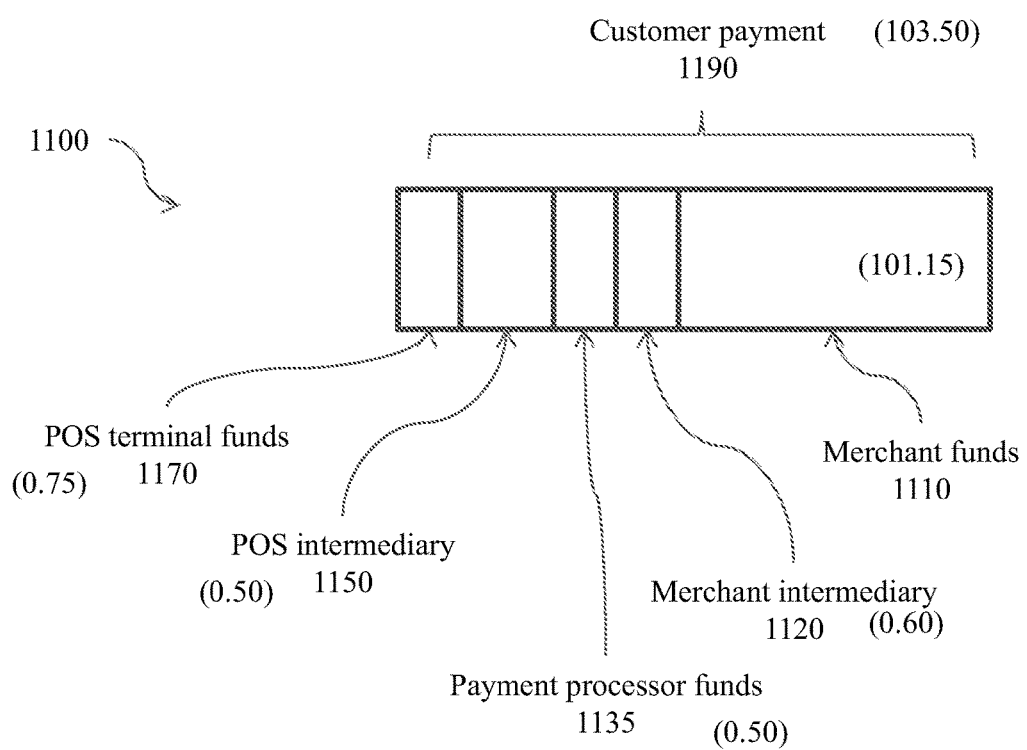
FIG. 11C illustrates division of funds in a specific example.

FIG. 11C illustrates division of funds in a specific example. Note that this is a representative example and is not specifically tied to either a specific embodiment or a real-life example. Customer payment 1190 is illustrated as $103.50. POS terminal funds 1170 are illustrated as $0.75. POS intermediary funds 1150 are $0.50. Payment processor funds 1135 involves $0.50. Merchant intermediary funds 1120 are illustrated as $0.60, leaving $101.15 to be passed on as merchant funds 1110.

FIG. 12 illustrates an embodiment of a set of entries of economic understandings corresponding to item codes. Item codes may be entered in an item master, or other item management or POS sub-system for a retail site. Each item code is shown with a corresponding set of economic understandings. An instance of an economic understanding provides a representation of how a payment will be broken down with various amounts apportioned to various actors. The various actors are expected to be entities which either accept payment, facilitate payment, process payment or in some way initiate or stage orders, for example. In some embodiments, an economic understanding specifies payment for each actor or entity in a chain or group of actors involved in transfer of a payment from a customer to a merchant.

Note that the economic understanding tied to a given item code may only specify an economic understanding for a portion of the chain or group of actors involved in transferring funds from a customer to a merchant. For example, the item code and associated economic understanding may specify what a retailer will earn and what a payment processor will earn for a given transaction, leaving the remaining portion of the chain or group of actors to have payments specified based on an economic understanding for a type of transaction, a given merchant, or other type of relationship.

Thus, one such actor would be a vendor or merchant which has agreed to provide goods or services to the customer. Another such actor may be a payment processor which is processing payments. Yet another actor may be a retail site such as one including a POS terminal which accepts payment from the customer. Other actors may be various intermediaries mentioned. Such intermediaries may be actual intermediaries interposed between actors already mentioned, for example. Other intermediaries may be facilitating a relationship between a merchant and the payment processor or a retail site payment processor, for example. Facilitating a relationship may involve something as simple as an initial introduction from which some form of commission is derived, or may involve an ongoing process of helping to smooth out problems or disputes and otherwise resolve potential issues.

Note that an economic understanding specifies how payments divide, and are applied to a specific order at the time of payment. Thus, an economic understanding for a given order may specify an overall fee to be paid by a consumer in addition to an amount ultimately applied to payment to a merchant or vendor. Moreover, division of the overall fee comes out of the economic understanding specification for the order as well. Thus, in one example, one may specify an overall fee of $3.50, with a breakdown of that fee into a portion to be paid to a retail location (e.g. where a POS terminal sits), a portion to be paid to a payment processor, and portion(s) for any third-party entities. Such third-party entities may be intermediaries, servicers, or other facilitating entities. Additionally, an economic understanding may specify a price, but typically would not. Also, an economic understanding may specify divisions of funds in terms of absolute amounts, percentages, or some combination of absolute amounts and percentages. Economic understandings are usually specified at the time of staging an order, and are referenced by information encoded or embodied in the order. The order, in turn, is referenced by information encoded or embodied in the token ID or token. The economic understanding applied is that current economic understanding at the time of payment for the order in most embodiments.

Figure 13:
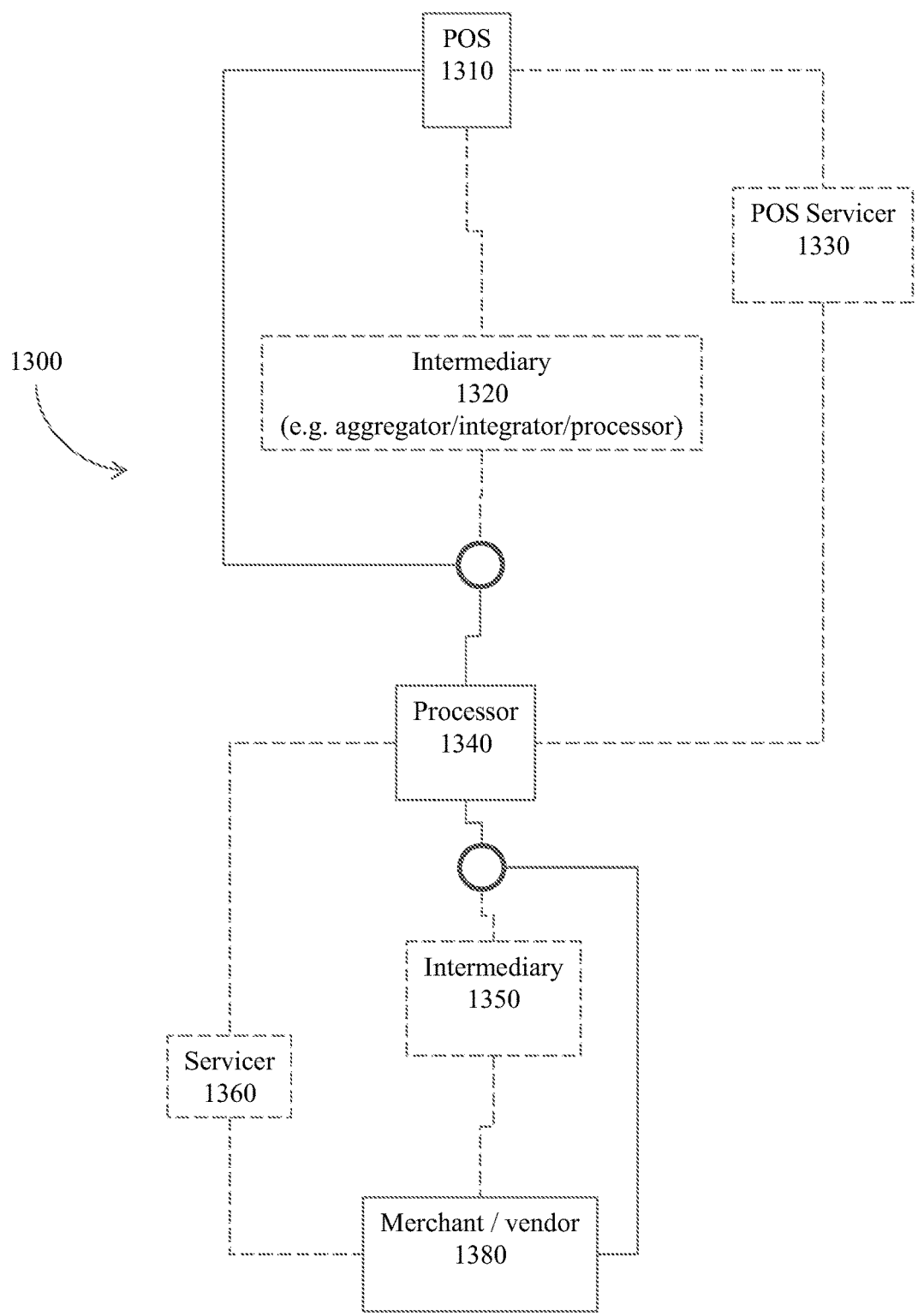
FIG. 13 illustrates potential flow of funds in an embodiment.

While an economic understanding specifies who gets funds, FIG. 13 illustrates potential flow of funds in one embodiment, and the flow may not be fully determined only by who ultimately receives funds. Funds may flow from one entity to another through various different paths. Structure 1300 illustrates how payments may flow showing various alternatives that may be involved. POS 1310 illustrates a retail site where a payment may be received from a consumer. Intermediary 1320 may be some form of intermediary which is interposed between POS retail site 1310 and processor 1340, and which may actually transfer funds from POS 1310 to processor 1340, for example. In contrast, POS servicer 1330 is illustrated as having a relationship with both POS 1310 and processor 1340 but not necessarily as interposed between the two entities. Thus, either POS 1310 or processor 1340 may transfer funds to POS servicer 1330. Additionally, there may be a direct path between POS 1310 and processor 1340. Note that these paths connote one- or two-way (e.g. mono-directional or bi-directional) flows for funds and/or information.

Processor 1340 essentially stands in the middle of a transaction or order. Processor 1340 may transfer funds to an intermediary 1350 which then transfers funds to merchant or vendor 1380. Alternatively, processor 1340 may transfer funds directly to merchant or vendor 1380 and either processor 1340 or merchant or vendor 1380 may then transfer funds to a servicer 1360 if needed. All of these transfers of funds are determined by an economic understanding encoded by a barcode or other encoding medium, which is used to provide input data to a POS terminal.

Note that an interpretation of an economic understanding may not be the final determination of how funds are transferred. The process of settling up orders or summarizing orders on a periodic basis may be used to correct for payments that were improperly applied on an immediate basis. For example, a payment processor may determine that an encoded economic understanding dictates that a payment corresponding to a certain threshold of orders is due to a certain entity at the time of completion of the order. However, upon further review, it may become apparent that the order has passed to a different threshold implying a different payment to the certain entity at the time of the order. This may be reflected in some sort of summary and settlement statement which may be issued by the payment processor. Moreover, the various payments may be specifically reflected in such statements along with transfers corresponding to those payments made on a periodic basis. This may be handled in a variety of ways, and reflects the ability to recover from or ameliorate problems or inaccuracies which may occur when one attempts to encode an economic understanding in advance of actual payment.

Figure 14:
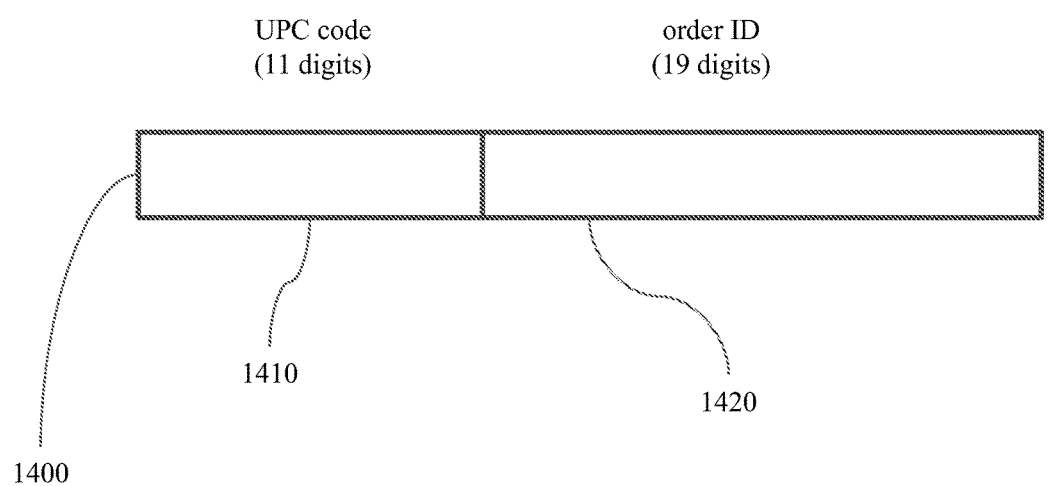
FIG. 14 illustrates a structure of information to be encoded or represented in a token in an embodiment.

FIG. 14 illustrates a structure of information to be encoded in a barcode in one embodiment. Note that this information 1400 may also be encoded in some other form of media, such as a magnetic stripe, RFID tag, or other information accessible in an electronic or mechanical manner. As illustrated, information 1400 includes an item code 1410 which is 11 digits long and an order ID 1420 which is 19 digits long. This is an example of a format that may be used, but other numbers of digits for an item code or the order ID may be used. For example, a common UPC code format involves 12 digits, and this may be used instead. Similarly providing a unique order ID may involve more or fewer digits in the order ID. In one format, a 12 digit UPC code may be used as an 11 digit code by omitting a check digit, for example.

Figure 15:
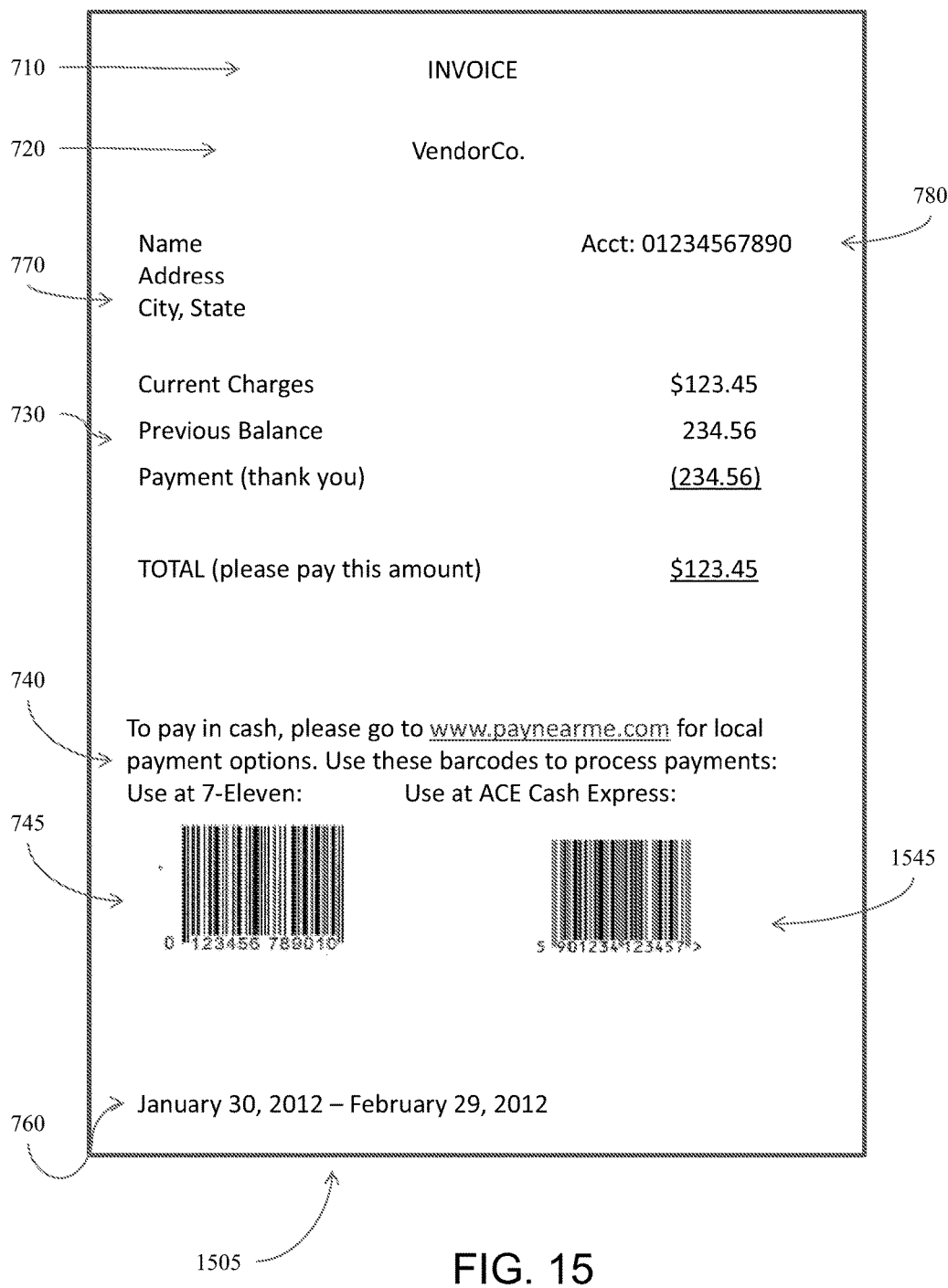
FIG. 15 illustrates an embodiment of another invoice.

Using item codes can also lead to other variations on an invoice or token document, for example. FIG. 15 illustrates an embodiment of another invoice. Illustrated in FIG. 15 is use of multiple barcodes to encode different economic understandings for different processing of an order through different retail sites. Thus, barcode 745 is included as with invoice 705 of FIG. 7A. However, barcode 1545 is also included on invoice 1505 of FIG. 15 to allow for different processing at two different types of retail locations. Thus, one may expect that barcode 745 encodes a first item code related to a first set of economic understandings for a first retail location. Barcode 1545 encodes a second item code related to a second set of economic understandings for a second retail location. Information 740 indicates which barcode to use at which retail location, for example.

It is noted that the figures, individually and/or collectively, serve as embodiments of the presented systems and methods. Each individual process or sub-process performed within the embodiments described can be performed by one or more parties, as well as one or more computer systems. For example, in one embodiment, some or all of the communications and data transfers between merchant, service provider, and POS terminal are performed via an automated computer-based system, such as an application program interface. Further, not all of the individual process or sub-process described are necessary for implementing the systems and methods described herein. As such, the embodiments presented in the figures are not intended to be limiting.

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

Unless defined otherwise, all technical and scientific terms used herein have the same meaning as commonly understood by one of ordinary skill in the art to which this invention belongs.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It is to be appreciated that the Detailed Description section, and not the Summary and Abstract sections, is intended to be used to interpret the claims. The Summary and Abstract sections may set forth one or more, but not all embodiments of the present invention as contemplated by the inventor(s), and thus, are not intended to limit the present invention and the appended claims in any way.

One skilled in the art will appreciate that although specific examples and embodiments of the system and methods have been described for purposes of illustration, various modifications can be made without deviating from present invention. For example, embodiments of the present invention may be applied to many different types of databases, systems and application programs. Moreover, features of one embodiment may be incorporated into other embodiments, even where those features are not described together in a single embodiment within the present document.

The invention claimed is:

1. A system comprising:
a customer mobile device;
a merchant computer configured to receive a customer order from the customer mobile device;
a service provider computer coupled to the merchant computer and the customer mobile device configured to receive a request to stage the order, wherein the request includes information identifying the merchant and information specific to the order, the service provider computer configured to generate a dynamic barcode having (1) a first portion representing first information not specific to the order including a first designation of a first overall fee to be provided by a customer including a payment to a merchant for the order and a portion of the first overall fee to be provided to a point-of-service and (2) a second portion representing information specific to the order, to transmit the dynamic barcode to the customer mobile device, and to cause the customer mobile device to display an image of the dynamic barcode; and
a point-of-service computer coupled to service provider computer to receive the image of the dynamic barcode and process the first information included in the first portion of the dynamic barcode to determine the first overall fee to be provided by the customer including the payment to the merchant for the order and the portion of the first overall fee to be paid to the point-of-service, and transmit a confirmation of receipt of the first overall fee and payment and the dynamic barcode to the service provider computer;
the service provider computer further configured to receive the confirmation of receipt of the first overall fee and payment and the dynamic barcode from the point-of-service computer, process the second portion of the dynamic barcode to determine the information specific to the order, transmit notification of the payment to the merchant, and cause the customer mobile device to display updated information for the order;
wherein the merchant, the service provider, and the point-of-service are each third parties remote to one another.

2. The system of claim 1, wherein the service provider computer is configured to generate a second dynamic barcode having a first portion including second information and a second portion representing information specific to the order, and to transmit the second dynamic barcode to the customer mobile device; and wherein the point-of-service computer is configured to receive the second dynamic barcode and transmit the second dynamic barcode to the service provider computer; and wherein the second information includes a second overall fee to be provided by the customer including the payment to the merchant and a portion of the second overall fee to be provided to the point-of-service.

3. The system of claim 2, wherein the service provider computer instructs the mobile device to display the first dynamic barcode and at the time of the payment causes the mobile device to display an image of the second dynamic barcode in place of the first dynamic barcode.

4. The system of claim 2, wherein the first information specifies an incentive to the point-of-service above a standard payment to the point-of-service and the second information specifies a standard payment to the point-of-service.

5. The system of claim 2, wherein the first information specifies a promotion for the customer and the second economic understanding specifies standard processing for the customer.

6. The system of claim 5, wherein the promotion is paid for by the merchant.

7. The system of claim 5, wherein the promotion is paid for by the service provider.

8. The system of claim 5, wherein the promotion is paid for by the point-of-service.

9. The system of claim 5, wherein the first information specifies an incentive to the point-of-service.

10. The system of claim 5, wherein the first information specifies an incentive to the merchant.

11. The system of claim 2 wherein, wherein the first information specifies a promotion for the customer.

12. The system of claim 2, the information specific to the order specifies a one-time order for a predetermined amount.

13. The system of claim 2, wherein the information specific to the order specifies a one-time order for an unspecified amount.

14. The system of claim 2, wherein the information specific to the order specifies a recurring order for a predetermined amount.

15. The system of claim 2, wherein the information specific to the order specifies a recurring order for an unspecified amount.

16. A system comprising:
a merchant computer to receive a customer order;
a service provider computer coupled to the merchant computer to receive a request to stage the order, wherein the request includes information identifying the merchant and information specific to the order, to generate a first dynamic barcode having a first portion representing first information not specific to the order and a second portion representing information specific to the order, wherein the first information includes a first designation of a first overall fee to be provided by a customer including a payment to a merchant for the order and a portion of the first overall fee to be provided to a point-of-service, to generate a second dynamic barcode having a first portion including second information and a second portion representing information specific to the order, wherein the second information includes a second overall fee to be provided by the customer including the payment to the merchant and a portion of the second overall fee to be provided to the point-of-service, and to transmit the first dynamic barcode and the second to dynamic barcode a customer computing device;

a first point-of-service computer coupled to service provider computer and programmed to receive the first dynamic barcode and process the first information included in the first portion of the first dynamic barcode to determine the first overall fee to be provided by the customer including the payment to the merchant for the order and the portion of the first overall fee to be paid to the point-of-service, and transmit a confirmation of receipt of the first overall fee and payment and the first dynamic barcode to the service provider computer;

a second point-of-service computer coupled to the service provider computer to receive the second dynamic barcode and process the second information included in the first portion of the first dynamic barcode to determine the second overall fee to be provided by the customer including the payment to the merchant for the order and the portion of the second overall fee to be paid to the point-of-service, and transmit a confirmation of receipt of the second overall fee and payment and the second dynamic barcode to the service provider computer, wherein the merchant, the service provider, the first point-of-service, and the second point-of-service are each third parties remote to one another.

17. The system of claim 16, wherein the computing device of the customer is a mobile device, and wherein the service provider computer is programmed to instruct the mobile device to display the first dynamic barcode and at the time of the payment force the mobile device to display the second dynamic barcode in place of the first dynamic barcode.

18. A system comprising:
a merchant computer to receive a customer order and a dynamic barcode, and to transmit the dynamic barcode to the customer;
a service provider computer coupled to the merchant computer configured to receive a request to stage the order, wherein the request includes information identifying the merchant and information specific to the order, to generate a dynamic barcode having a first portion representing first information not specific to the order including a first designation of a first overall fee to be provided by a customer including and a second portion representing information specific to the order, and to transmit the dynamic barcode to a customer computing device; and
a point-of-service computer coupled to service provider computer to receive the dynamic barcode and process the first information included in the first portion of the dynamic barcode to determine the first overall fee to be provided by the customer, and transmit a confirmation of receipt of the first overall fee and payment and the dynamic barcode to the service provider computer.

19. The system of claim 18, wherein the dynamic barcode has 30 digits, the first portion has 11 digits, and the second portion has 19 digits.

* * * * *